United States Patent
McHugh et al.

(10) Patent No.: US 10,531,762 B2
(45) Date of Patent: Jan. 14, 2020

(54) CARTRIDGE HOLDER FOR BEVERAGE MACHINE

(71) Applicant: Bedford Systems LLC, New York, NY (US)

(72) Inventors: William Philip McHugh, Foxborough, MA (US); Jeremy B. Gordon, Boston, MA (US); Scott Grubb, Cambridge (GB); Steven Mackey, Dedham, MA (US); Thomas Fedorka, Billerica, MA (US); Peter Rae Peterson, Williston, VT (US); Thomas J. Novak, Morristown, VT (US); Thomas Paul Dutremble, Boston, MA (US); Gwynn Masada, Portola Valley, CA (US); Bradford Range, Allen, TX (US); Enrico Raffaele Cafaro, Beverly, MA (US); Steven Raphaelson, Watertown, MA (US); Michael Sack, North Reading, MA (US); Brian B. Johnson, Newfields, NH (US)

(73) Assignee: BEDFORD SYSTEMS LLC, Bedford, MA (US)

( * ) Notice: Subject to any disclaimer, the term of this patent is extended or adjusted under 35 U.S.C. 154(b) by 530 days.

(21) Appl. No.: 15/042,219

(22) Filed: Feb. 12, 2016

(65) Prior Publication Data
US 2016/0235242 A1  Aug. 18, 2016

Related U.S. Application Data

(60) Provisional application No. 62/117,035, filed on Feb. 17, 2015.

(51) Int. Cl.
A47J 31/40  (2006.01)

(52) U.S. Cl.
CPC .................................. *A47J 31/407* (2013.01)

(58) Field of Classification Search
CPC ........................... A47J 31/407; A47J 31/3623
(Continued)

(56) References Cited

U.S. PATENT DOCUMENTS

| 4,025,655 A | 5/1977 | Whyte et al. |
| 4,040,342 A | 8/1977 | Austin et al. |

(Continued)

FOREIGN PATENT DOCUMENTS

| DE | 602004000009 T2 | 12/2005 |
| EP | 1 440 639 A1 | 7/2004 |

(Continued)

OTHER PUBLICATIONS

International Search Report and Written Opinion dated Jun. 7, 2016 in connection with International Application No. PCT/US2016/017986.

*Primary Examiner* — Dana Ross
*Assistant Examiner* — Kuangyue Chen
(74) *Attorney, Agent, or Firm* — Dorsey & Whitney LLP

(57) ABSTRACT

A beverage making machine having a cartridge holder with an upper portion movable in pivotal and/or linear ways relative to a lower portion. An actuator for the cartridge portion may include a handle-actuated spur gear and link to move the upper portion, which may be guided in movement via a cam and cam follower engagement. Information from a cartridge detector may be used based on movement of cartridge holder portions, e.g., as an upper portion moves from an open position to a closed position. A mixing chamber may be held by a drawer so as to be removable, and movement of the drawer may engage/disengage the mixing chamber from a fluid supply.

35 Claims, 12 Drawing Sheets

(58) Field of Classification Search
USPC .......................................................... 99/280
See application file for complete search history.

(56) References Cited

U.S. PATENT DOCUMENTS

| | | | |
|---|---|---|---|
| 4,287,921 A * | 9/1981 | Sanford | A47G 19/34 |
| | | | 141/286 |
| 4,636,337 A | 1/1987 | Gupta et al. | |
| 5,182,084 A | 1/1993 | Plester | |
| 6,712,342 B2 | 3/2004 | Bosko | |
| 2007/0221066 A1* | 9/2007 | Sullivan | A47J 31/3695 |
| | | | 99/279 |
| 2008/0160153 A1 | 7/2008 | Hestekin et al. | |
| 2011/0001781 A1* | 1/2011 | Ishibe | B41J 2/17509 |
| | | | 347/86 |
| 2014/0141140 A1* | 5/2014 | Bugnano | A47J 31/30 |
| | | | 426/431 |
| 2014/0261000 A1 | 9/2014 | Weflen | |
| 2014/0299000 A1* | 10/2014 | Hanneson | A47J 31/46 |
| | | | 99/300 |
| 2014/0338543 A1 | 11/2014 | Smith et al. | |
| 2015/0173560 A1 | 6/2015 | De Mango | |

FOREIGN PATENT DOCUMENTS

| | | |
|---|---|---|
| EP | 2 148 598 A1 | 2/2010 |
| EP | 2 189 086 A1 | 5/2010 |
| EP | 2461723 B1 | 7/2014 |
| WO | WO 2008124851 A1 | 10/2008 |
| WO | WO 2011124484 A1 * | 10/2011 .......... A47J 31/3633 |

\* cited by examiner

CARTRIDGE HOLDER FOR BEVERAGE MACHINE

CROSS REFERENCE TO RELATED APPLICATION

This application claims the benefit of U.S. Provisional Application No. 62/117,035, filed Feb. 17, 2015, which is hereby incorporated by reference in its entirety.

BACKGROUND

The inventions described herein relate to a device for holding a cartridge to form a beverage, e.g., for preparing a carbonated beverage. Systems for carbonating liquids and/or mixing liquids with a beverage medium to form a beverage are described in a wide variety of publications, including U.S. Pat. Nos. 4,025,655; 4,040,342; 4,636,337; 6,712,342 and 5,182,084; and PCT Publication WO 2008/124851.

SUMMARY OF INVENTION

Aspects of the invention provide a beverage making machine having a cartridge holder arranged to hold a cartridge containing a material used by the beverage making machine to form a beverage. The cartridge may contain a gas source configured to release a pressurized gas used to carbonate a beverage and/or a beverage medium, such as a flavoring, used to flavor a beverage. The cartridge holder may include a lower portion arranged to receive and hold a cartridge placed at a cartridge receiving area of the lower portion, and an upper portion movable relative to the lower portion between an open position in which the cartridge receiving area is exposed for placement of a cartridge and a closed position in which the upper and lower portions enclose the cartridge to access material in the cartridge to form a beverage. An actuator may be arranged to move the lid between the open and closed positions, with the upper portion being arranged to move pivotally relative to the lower portion during an initial phase of movement from the open position toward the closed position, and being arranged to move linearly relative to the lower portion during a later phase of movement from the open position toward the closed position. This configuration may allow the upper portion to be positioned rearwardly and away from the lower portion at the open position, better exposing the cartridge receiving area, and allow for more accurate clamping and/or piercing of the cartridge during the linear phase of movement near the closed position. The machine may include other components to form a beverage, such as a precursor liquid supply to provide precursor liquid used to form a beverage using the material in the cartridge, control circuitry to control component operation, etc.

In one embodiment, the machine may include a frame arranged to support components of the beverage making machine and having a cam or cam follower. Correspondingly, the upper portion may include the other of a cam or cam follower arranged to engage with the cam or cam follower of the frame such that movement of the upper portion relative to the frame causes the cam or cam follower of the upper portion to move relative to the cam or cam follower of the frame thereby causing the upper portion to move pivotally relative to the frame during the initial phase of movement and to move linearly relative to the frame during the later phase of movement. In some embodiments, the upper portion includes a cam follower arranged to engage with a cam of the frame, e.g., the upper portion may include forward and rear cam followers arranged to engage, respectively, with forward and rear cams of the frame. In one case, the rear cam is linear and the forward cam has an S-shape so as to provide the desired movement of the upper portion. The cam followers may be pins and the cams are grooves in which the pins may slide.

In one embodiment, the actuator may include a handle pivotally mounted to the frame and having a handle gear arranged to drive movement of the upper portion with movement of the handle. The actuator may further include a spur gear having a strut, with the spur gear being pivotally mounted to the frame and engaged with the handle gear such that movement of the handle causes rotation of the spur gear. A link may be connected at a first end to the strut and connected at a second end to the upper portion such that rotation of the spur gear causes movement of the upper portion relative to the frame. In one embodiment, the actuator includes a detent that operates to retain the handle at a position corresponding to the open position for the upper portion and at a position corresponding to the closed position for the upper portion.

In some cases, the upper portion includes a piston arranged for axial movement relative to the upper portion, with the upper portion and the piston defining a pressure chamber arranged to receive a portion of the cartridge. In some cases, pressure in the pressure chamber causes the piston to move downwardly relative to the upper portion and exert a clamping force on the cartridge. The upper portion may be arranged to clamp the cartridge in place so as to force a bottom of the cartridge into an opening structure that causes an outlet at the bottom of the cartridge to open. For example, the cartridge outlet may be pierceable and the upper portion may force the outlet into contact with a piercing structure to cause the outlet to open. The lower portion may include a basket to receive the cartridge, and the basket may be movable in a vertical direction relative to the lower portion. In some embodiments, the basket may be spring biased to move upwardly e.g., to hold the cartridge in an upper position upon receipt. Downward movement of the cartridge against the spring bias may cause a dispensing gas piercing element to pierce the cartridge, e.g., to introduce pressurized gas or liquid into the cartridge to move beverage medium out of the cartridge. Also, the upper portion may be arranged to pierce the cartridge, e.g., to introduce an activating liquid to the cartridge that causes release of a gas from a gas source in the cartridge.

In another aspect of the invention, a beverage making machine includes a frame arranged to support components of the beverage making machine with the frame having a forward cam or cam follower and a rear cam or cam follower. A cartridge holder may be supported by the frame and arranged to hold a cartridge containing a material used by the beverage making machine to form a beverage. The cartridge holder may include a lower portion arranged to receive and hold a cartridge placed at a cartridge receiving area of the lower portion, and an upper portion having a forward cam follower or cam arranged to engage with the forward cam or cam follower of the frame, and a rear cam follower or cam arranged to engage with the rear cam or cam follower of the frame. Engagement of the forward and rear cams and cam followers may control movement of the upper portion relative to the lower portion between an open position in which the cartridge receiving area is exposed for placement of a cartridge and a closed position in which the upper and lower portions enclose the cartridge to access material in the cartridge to form a beverage. An actuator may be arranged to move the lid between the open and closed positions. The machine may include other components, such as a precursor liquid supply to provide precursor liquid used to form a beverage using the material in the cartridge. Other elements described above, such as the actuator including a handle, etc., may be included as well.

In another aspect of the invention, a beverage making machine includes a frame arranged to support components of the beverage making machine, and a cartridge holder supported by the frame and arranged to hold a cartridge containing a material used by the beverage making machine to form a beverage. The cartridge holder may include a lower portion arranged to receive and hold a cartridge placed at a cartridge receiving area of the lower portion, and an upper portion movable relative to the lower portion between an open position in which the cartridge receiving area is exposed for placement of a cartridge and a closed position in which the upper and lower portions enclose the cartridge to access material in the cartridge to form a beverage. An actuator may be arranged to move the lid between the open and closed positions, with the actuator including a handle pivotally mounted to the frame and having a handle gear, and a spur gear pivotally mounted to the frame and engaged with the handle gear such that movement of the handle causes rotation of the spur gear. The spur gear may have a strut connected to the upper portion such that rotation of the spur gear causes movement of the upper portion relative to the frame. In some embodiments, a link is pivotally connected at a first end to the strut and pivotally connected at a second end to the upper portion so that movement of the strut is transmitted to the upper portion. In some cases, the upper portion is arranged to move pivotally relative to the lower portion during an initial phase of movement from the open position toward the closed position, and arranged to move linearly relative to the lower portion during a later phase of movement from the open position toward the closed position. As also discussed above, the frame may include a cam or cam follower, and the upper portion may include the other of a cam or cam follower arranged to engage with the cam or cam follower of the frame so that movement of the upper portion relative to the frame causes the cam or cam follower of the upper portion to move relative to the cam or cam follower of the frame thereby causing the upper portion to move between the open and closed positions relative to the frame. In some embodiments, movement of the upper portion relative to the frame causes the cam or cam follower of the upper portion to move relative to the cam or cam follower of the frame thereby causing the upper portion to move pivotally relative to the frame during an initial phase of movement and to move linearly relative to the frame during a later phase of movement.

In another aspect of the invention, a beverage making machine includes a cartridge holder arranged to hold a cartridge containing a beverage medium used by the beverage making machine to form a beverage, and a precursor liquid supply having a dispense line arranged to provide precursor liquid used to form a beverage using the beverage medium. A mixing chamber may be arranged to receive beverage medium from a cartridge in the cartridge holder, to receive precursor liquid from the dispense line, and to mix the beverage medium and precursor liquid to form a beverage dispensed at a dispensing station of the machine. The mixing chamber may be mounted to a drawer that is removable from the machine by sliding, such that removal of the drawer from the machine disengages the mixing chamber from the dispense line, and replacement of the drawer fluidly couples the mixing chamber with the dispense line. Such an arrangement may make removal and replacement of the mixing chamber much easier for a user, e.g., by allowing the user to manipulate a relatively larger and simpler drawer construction. The mixing chamber may be removable from the drawer, e.g., for cleaning and replacement.

In one embodiment, the mixing chamber includes a precursor liquid inlet fluidly couplable to the dispense line, a beverage medium chamber arranged to receive beverage medium into the beverage medium chamber, and a dispense outlet from which beverage medium and precursor liquid are dispensed. The beverage medium chamber may include a chamber inlet fluidly coupled to the precursor liquid inlet and a chamber outlet downstream of the chamber inlet and fluidly coupled to the dispense outlet so that with precursor liquid flowing from the precursor liquid inlet to the dispense outlet, pressurized beverage medium in the beverage medium chamber flows through the chamber outlet to the dispense outlet and flow of precursor liquid into the beverage medium chamber via the chamber inlet is prevented. However, in the absence of pressurized beverage medium in the beverage medium chamber and with precursor liquid flowing from the precursor liquid inlet to the dispense outlet, precursor liquid flows into the beverage medium chamber via the chamber inlet.

In one embodiment, the precursor liquid inlet and the dispense outlet are connected by a 90 degree elbow such that the chamber inlet is positioned at an upstream end of the 90 degree elbow, and the chamber outlet is positioned at a downstream end of the 90 degree elbow. In some cases, the chamber inlet and chamber outlet are positioned at a radially outer wall of the 90 degree elbow, and the chamber outlet may include a plurality of channels that lead downwardly from the beverage medium chamber. The chamber inlet may be oriented in a horizontal direction and the chamber outlet may be arranged in a vertical direction. Thus, the beverage medium chamber may be arranged to receive beverage medium that flows in a downward direction from the cartridge, the chamber inlet may be arranged to receive precursor liquid in a horizontal direction into the beverage medium chamber, and the chamber outlet is arranged to conduct flow of beverage medium downwardly to the dispense outlet.

In some embodiments, the precursor liquid supply includes a carbonation tank having an inlet to receive precursor liquid, and an outlet to deliver precursor liquid from the tank to the dispense line A carbonating gas supply line may be fluidly coupled to the carbonation tank to deliver carbon dioxide gas to the carbonation tank to carbonate the precursor liquid. In some embodiments, the cartridge holder is arranged to provide carbon dioxide gas from a gas source in the cartridge to the carbonating gas supply line. Also, the precursor liquid supply may be arranged to deliver precursor liquid to the gas source in the cartridge to cause the gas source to release carbon dioxide.

In another aspect of the invention, a beverage making machine includes a cartridge holder arranged to hold a cartridge containing a material used by the beverage making machine to form a beverage. The cartridge holder may include a lower portion arranged to receive and hold a cartridge placed at a cartridge receiving area of the lower portion, and an upper portion movable relative to the lower portion between an open position in which the cartridge receiving area is exposed for placement of a cartridge and a closed position in which the upper and lower portions enclose the cartridge to access material in the cartridge to form a beverage. An actuator may move the lid between the open and closed positions, and a precursor liquid supply may provide precursor liquid used to form a beverage using the material in the cartridge. A cartridge sensor may detect a presence of a cartridge at the cartridge receiving area, and control circuitry including a holder sensor may detect the upper portion at the open position and at the closed position. The control circuitry may be arranged to activate the cartridge sensor when the holder sensor detects the upper portion is moved from the open position and arranged to use information from the cartridge sensor only if the holder sensor detects the upper portion at the closed position without again detecting the upper portion at the open position after the cartridge sensor is activated. Thus, the cartridge sensor may be able to detect the presence of a cartridge before the cartridge holder is closed, yet the control circuitry can ensure that only valid cartridge presence information is used to control machine operation. In one embodiment, the holder sensor includes a first switch to detect the upper portion at the open position and a second switch to detect the upper portion at the closed position. Thus, the control circuitry may be able to confirm whether the upper portion is at the open position, closed position or an intermediate position. In one embodiment, the cartridge sensor includes an infrared light emitter and an infrared light detector. In some cases, the cartridge sensor may be arranged to detect whether a cartridge is usable to form a carbonated beverage or not, and the control circuitry may be arranged to receive information from the cartridge sensor whether the cartridge is arranged to form a carbonated beverage or not and to control the machine accordingly. In some embodiments, the control circuitry may include a second cartridge sensor arranged to detect whether a cartridge in the cartridge holder is authorized for use by the machine.

As mentioned above, some aspects of the invention relate to carbonating or otherwise dissolving a gas in a precursor liquid, such as water, to form a beverage. In some embodiments, a carbon dioxide or other gas source can be provided in a cartridge which is used to generate carbon dioxide or other gas that is dissolved into the precursor liquid. In some embodiments, a beverage medium, such as a powdered drink mix or liquid syrup, may be provided in the same, or a separate cartridge as the gas source and mixed with the precursor liquid (either before or after carbonation) to form a beverage. The use of one or more cartridges for the gas source and/or beverage medium may make for an easy to use and mess-free system for making carbonated or other sparkling beverages, e.g., in the consumer's home. (The term "carbonation" or "carbonated" is used herein to generically refer to beverages that have a dissolved gas, and thus refers to a sparkling beverage whether the dissolved gas is carbon dioxide, nitrogen, oxygen, air or other gas. Thus, aspects of the invention are not limited to forming beverages that have a dissolved carbon dioxide content, but rather may include any dissolved gas.)

Precursor liquid used to form the beverage may be carbonated in the first cartridge portion, or in one or more other areas (such as a reservoir or membrane carbonator) to which gas is delivered such that the beverage does not contact the gas source material. Mixing of the precursor liquid with beverage medium may occur before or after carbonation, and may occur in a second cartridge portion or in another location, such as a mixing chamber separate from the second cartridge portion.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. For example, aspects of the invention are described with reference to a specific cartridge embodiment, but aspects of the invention are not limited to the cartridge arrangements described herein. Thus, aspects of the invention are not intended to be construed narrowly in view of the illustrative embodiments. In addition, it should be understood that aspects of the invention may be used alone or in any suitable combination with other aspects of the invention.

Figure 1:
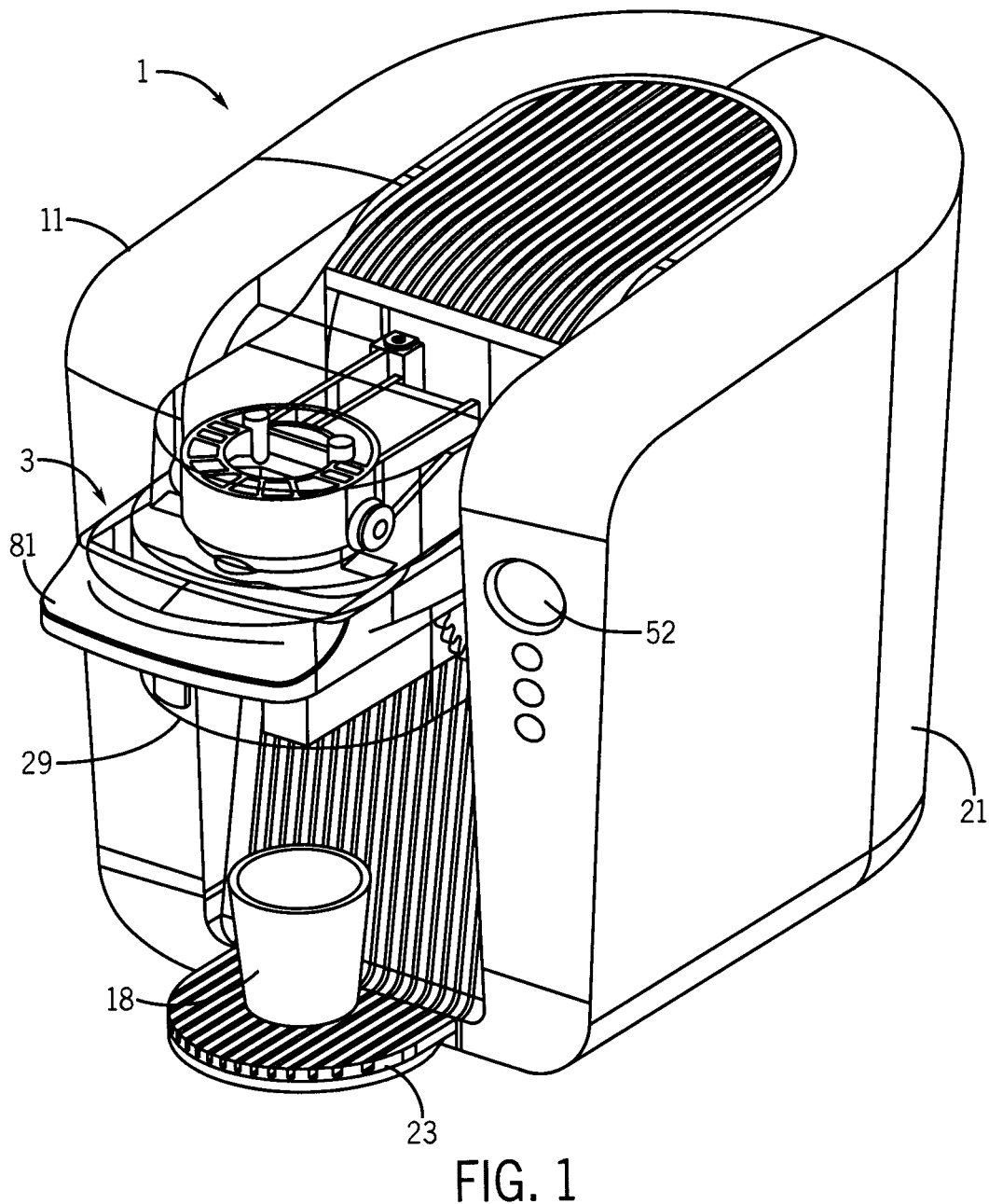
FIG. 1 shows a perspective view of a beverage making machine in an illustrative embodiment.
Figure 2:
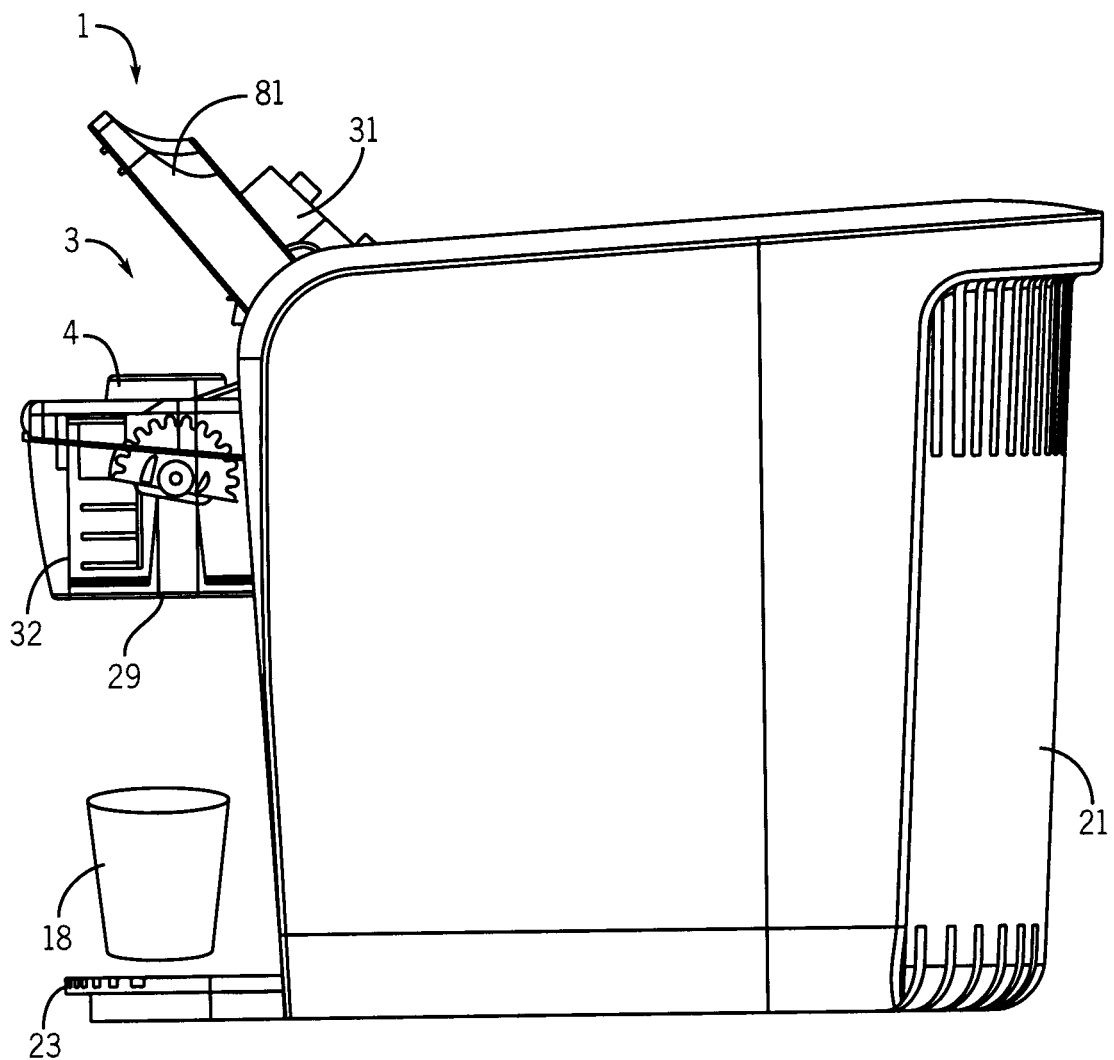
FIG. 2 shows a side view of the FIG. 1 beverage making machine.

FIGS. 1 and 2 show an illustrative embodiment of a beverage making machine 1 that incorporates one or more aspects of the invention. In this embodiment, components of the beverage making machine 1 are located in or on a housing 21 which includes a drip tray 23 to support a user's cup or other container 18 and a reservoir 11 to provide water (a precursor liquid) to make a beverage. In this case, the reservoir 11 is optionally removable from the housing 21 and contains beverage precursor liquid that is used to form a beverage dispensed at a dispensing station 29 into the user's container 18. The reservoir 11 includes a removable lid that can be removed to provide precursor liquid into the reservoir 11, but such a lid is not required. Moreover, the reservoir 11 need not be removable and/or may be replaced by a plumbed connection to a mains water source. The beverage precursor liquid can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply which provides the precursor liquid for conditioning of some kind, e.g., carbonation, filtering, chilling, mixing with a beverage medium, etc., and subsequent dispensing as a beverage.

A cartridge 4 (see FIG. 2) containing a gas source and/or a beverage medium may be associated with a cartridge holder 3 of the machine 1 so that the machine 1 can use material in the cartridge to form a beverage. For example, the gas source may emit carbon dioxide or other gas which is used by the machine 1 to carbonate the precursor liquid, and a beverage medium, such as a flavoring agent, may be mixed with precursor liquid, whether carbonated or not. In this embodiment, the cartridge 4 may be associated with the cartridge holder 3 by moving an upper portion 31 of the holder 3 to an open position (see FIG. 2) to expose a cartridge receiving area of a lower portion 32 of the holder 3. The cartridge 4 may be placed in the cartridge receiving area of the lower portion 32 and then the upper portion 31 moved to the closed position by operating a handle 81. Thereafter, a user may interact with an interface 52, such as a touch screen, button or other device by which the user can cause the machine 1 to make a beverage. In response, the machine 1 may access one or more compartments of the cartridge 4 and use material in the cartridge 4 to form the beverage. Since the cartridge 4 may be replaceable, a user may exchange the cartridge 4 to make different beverages, such as carbonated water only, a carbonated and flavored beverage, a still and flavored beverage, etc.

In accordance with an aspect of the invention, the upper portion of the cartridge holder may be moved by an actuator that includes a handle having a handle gear engaged with a spur gear that is connected to the upper portion. As a result, movement of the handle causes movement of the spur gear, thereby causing the upper portion to move relative to the lower portion. In one embodiment, a connecting link is connected between a strut of the spur gear and the upper portion, e.g., the link may be pivotally connected to the strut at a first end, and pivotally connected to the upper portion at a second end. Thus, the connecting link may translate motion of the spur gear to the upper portion.

Figure 3:
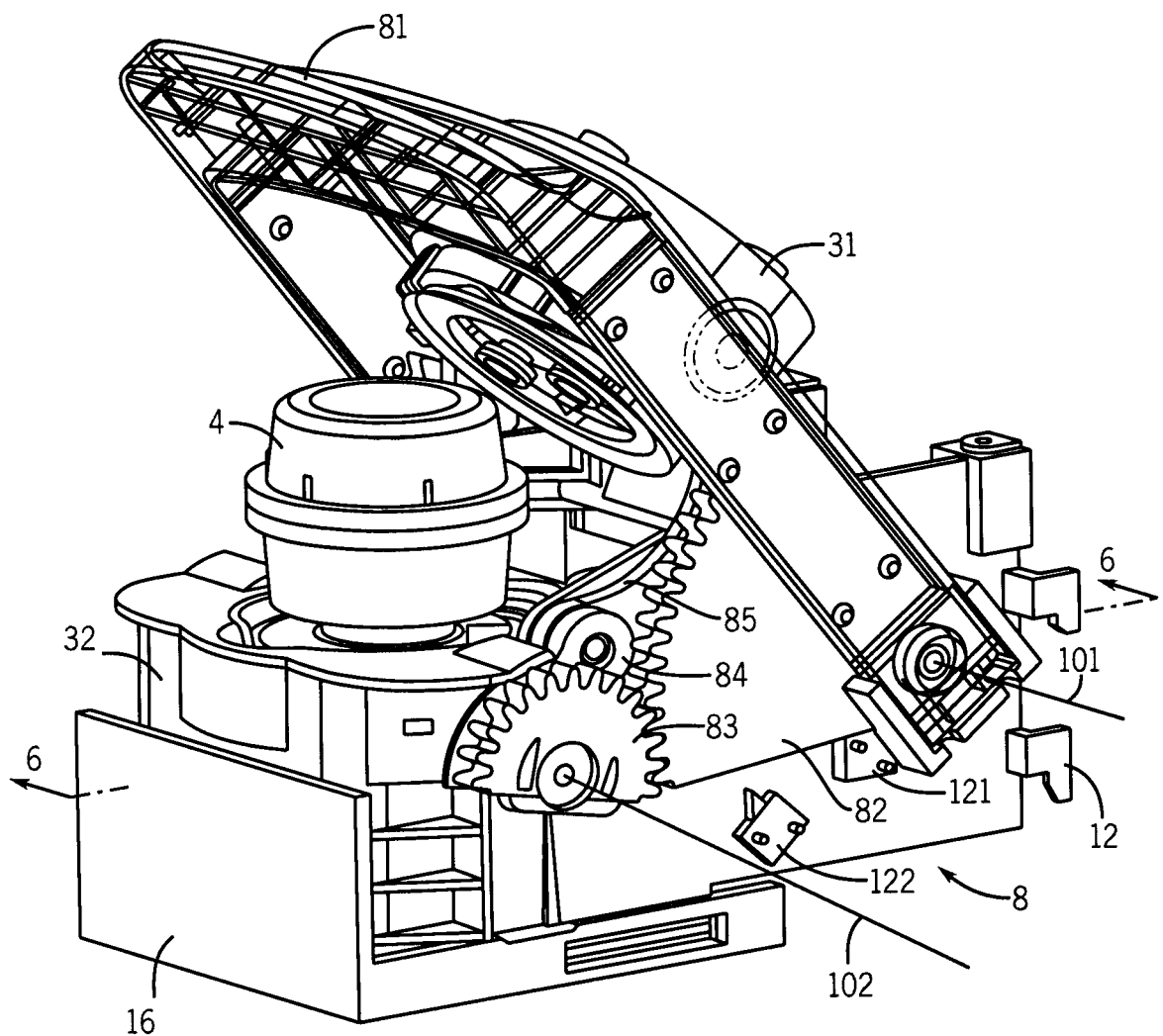
FIG. 3 shows a perspective view of a cartridge holder of the beverage making machine in an illustrative embodiment.
Figure 4:
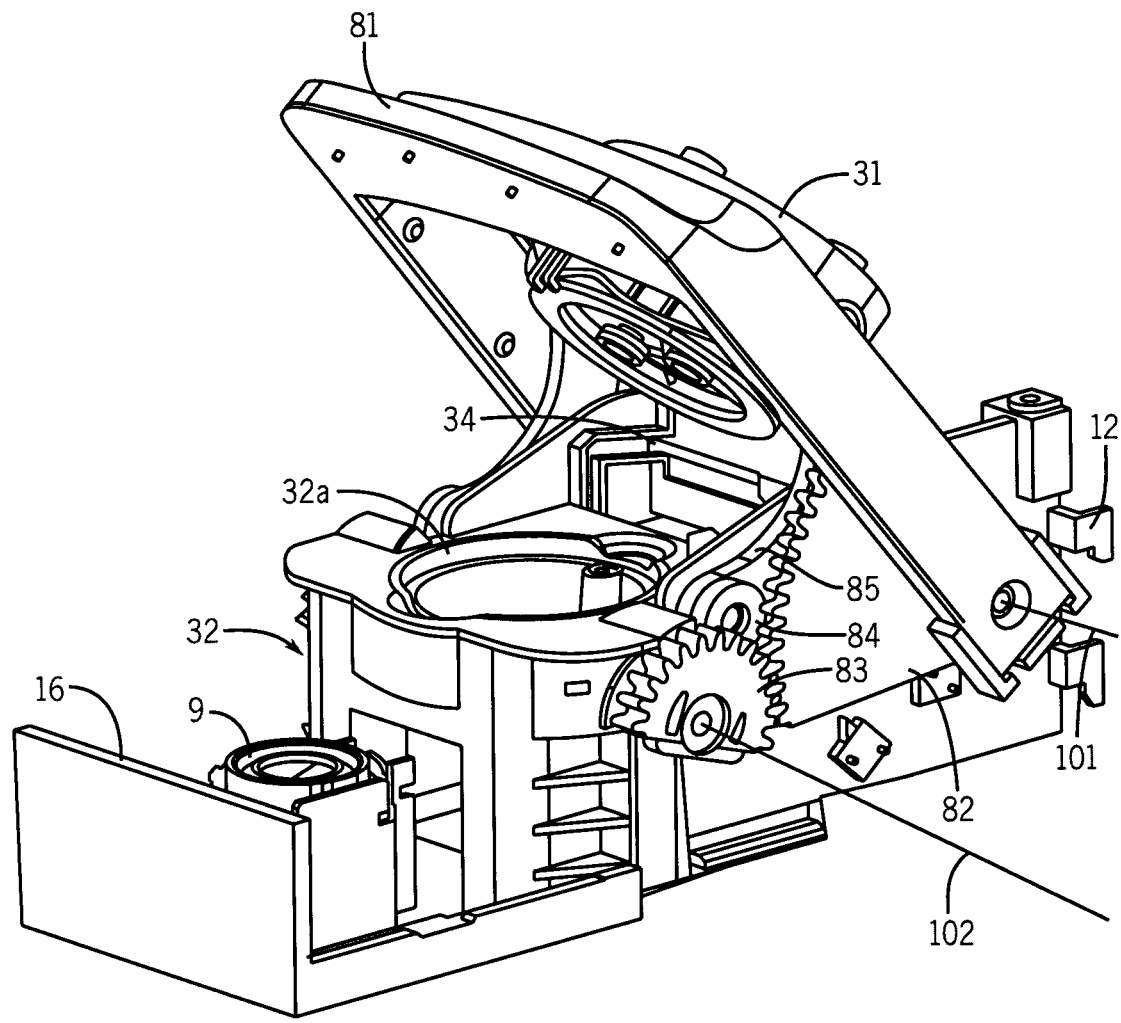
FIG. 4 shows the view of FIG. 3 without a cartridge at a cartridge receiving area.

FIGS. 3 and 4 show perspective views of the cartridge holder 3 in this illustrative embodiment, both with and without a cartridge 4 near a cartridge receiving area 32a of the lower portion 32. FIGS. 3 and 4 show the upper portion 31 in the open position with the cartridge receiving area 32a exposed for placement or removal of a cartridge 4. In this embodiment, an actuator 8 that causes movement of the upper portion 31 relative to the lower portion 32 includes a handle 81 having a sector gear 82 fixed relative to the handle 81. The handle 81 and sector gear 82 are pivotally mounted to a frame 12 of the machine 1 so as to be rotatable about a handle axis 101. A spur gear 83 is engaged with the gear 82 and is pivotally mounted to the frame 12 about a spur axis 102. Thus, rotation of the handle 81 and gear 82 causes rotation of the spur gear 83. The spur gear 83 has a strut 84 fixed to the spur gear 83 so that the strut 84 rotates with the spur gear 83. A connecting link 85 has a first end pivotally attached to the strut 84 and a second end pivotally attached to the upper portion 31. As a result, rotation of the handle 81 causes the upper portion 31 to move relative to the lower portion 32 between open and closed positions. Note that the connecting link 85 is not required, and instead the strut 84 may be connected directly to the upper portion 31, if desired. Also, in this embodiment, the actuator 8 includes two gears 82, two spur gears 83 and two connecting links 85, i.e., one set on each side of the cartridge receiving area 32a where the handle 81 is attached to the frame 12. However, only one set, such as the right-side set shown in FIGS. 3 and 4 may be used.

Figure 5:
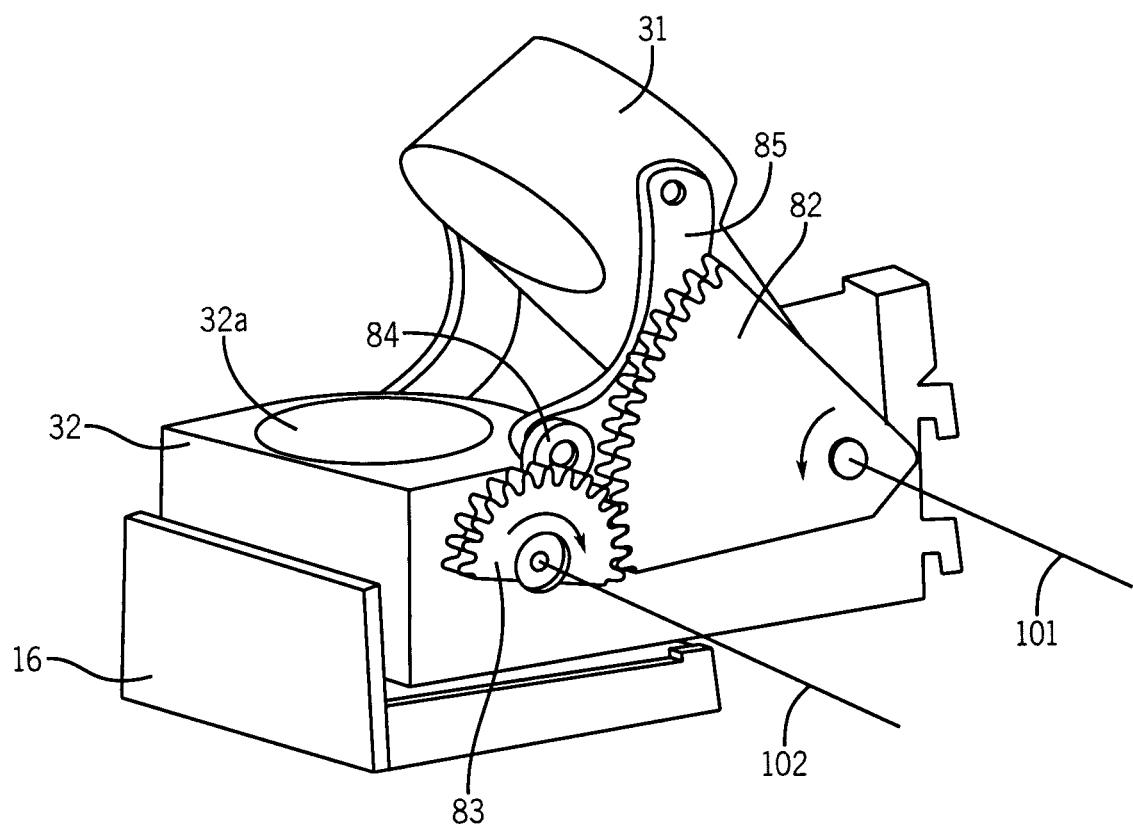
FIG. 5 shows the view of FIG. 4 with the handle removed for clarity.

FIG. 5 shows a view of the cartridge holder and actuator similar to that in FIG. 4, but the handle 81 has been removed for clarity. As can be seen, rotation of the gear 82 in a counterclockwise direction about the handle axis 101 causes the spur gear to rotate in a clockwise direction about the spur axis 102. This causes the strut 84 to move along an arcuate path in the clockwise direction, which pulls the first end of the connecting link 85 downwardly. As a result, the upper portion 31 is pulled downwardly by the connecting link 85 toward the closed position. Rotation of the handle 81 and gear 82 in the opposite direction causes the link 85 to move the upper portion 31 away from the lower portion 32 and to the open position.

Figure 7:
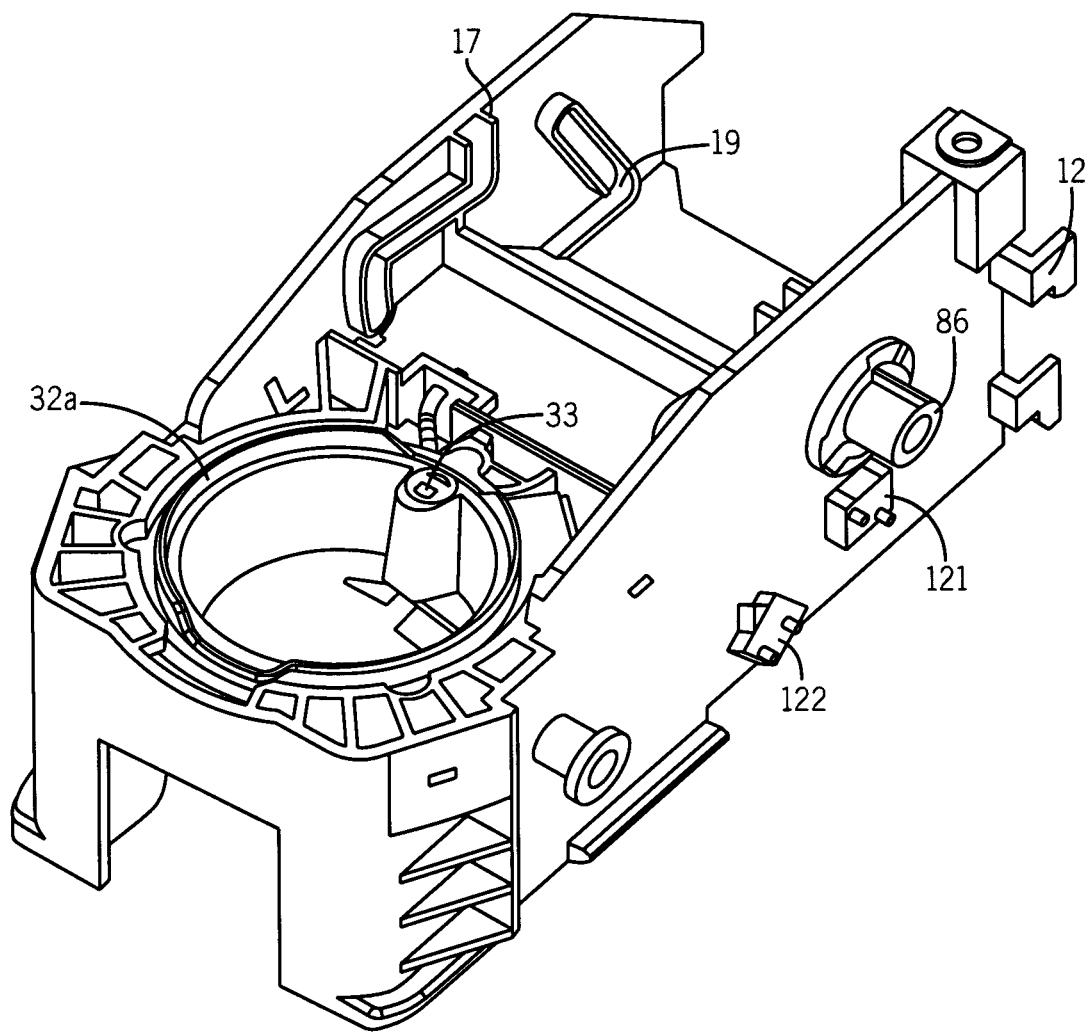
FIG. 7 shows a perspective view of the lower portion of the cartridge holder.

The handle 81 may also include a detent that provides tactile feedback to the user, such as when the upper portion arrives at the open position and/or the closed position, as well as provide a retaining force to help keep the upper portion at the open or closed position in the absence of a suitably large force to move the handle 81. While the detent may be implemented in different ways, in this embodiment, the detent 86 may include a pair of elements that are mounted to pivot about the handle axis 101 and are spring biased toward each other to provide the detent features. FIG. 7 shows one half of the detent 86 which has a "castle-nut" type feature that meshes with a corresponding element not shown. A spring may provide the desired biasing force to urge the castle-nut elements toward each other, and may be held in place by a screw that attaches the handle 81 to its pivot point on the frame 12. Other detent configurations are possible, however, such as a spring-loaded ball type, and others.

In accordance with another aspect of the invention, movement of the upper portion relative to a frame of the machine may be controlled in part by interaction of a cam or cam follower on the upper portion with a corresponding cam or cam follower on the frame. For example, the upper portion may include a cam follower that engages with and follows a profile of a cam on the frame. Such an arrangement may allow for a wide variety of different movements of the upper portion relative to the lower portion and frame since movement of the upper portion may be dictated by the shape of one or more cams. In one embodiment, the upper portion may be capable of pivotal movement about an axis that does not have a fixed location, and instead may move with movement of the upper portion, e.g., the pivot axis may move rearwardly relative to the cartridge receiving area as the upper portion moves toward the open position. In other embodiments, the upper portion may pivot in one portion of its movement (the pivot axis may be movable), but move linearly in another portion of its movement. For example, in accordance with one aspect of the invention, the upper portion of the cartridge holder may be arranged to move pivotally in an initial phase of motion from the open position toward the closed position, and then move linearly relative to the lower portion in a later phase of motion toward the closed position. Such motion may provide at least two advantages, including a) pivotal movement of the upper portion may help move the upper portion away from the cartridge receiving area of the lower portion, thereby allowing easier access to the cartridge receiving area, and b) linear movement of the upper portion may help with proper seating of the cartridge in the holder, proper piercing of the cartridge (if employed), proper sealing of the upper portion with the cartridge (if employed) or other features. That is, cartridge holders that have an upper portion which moves only pivotally can suffer from improper piercing of a cartridge, e.g., because a piercing element may move along an arc when piercing the cartridge, which may cause tearing of the cartridge. In addition, or alternately, arcuate movement of the upper portion may cause the upper portion to engage a cartridge at one side before the other (e.g., a side of the cartridge nearest the pivot axis of the upper portion), and thus cause the cartridge to be improperly seated and/or an improper seal with the cartridge to be formed. On the other hand, cartridge holders that have an upper portion move only along a linear path typically have the upper portion positioned over a cartridge receiving area when the upper portion is in an open position, thus blocking access to the receiving area or requiring that the receiving area be movable, e.g., slidable away from the upper portion to allow access to the receiving area.

Figure 6:
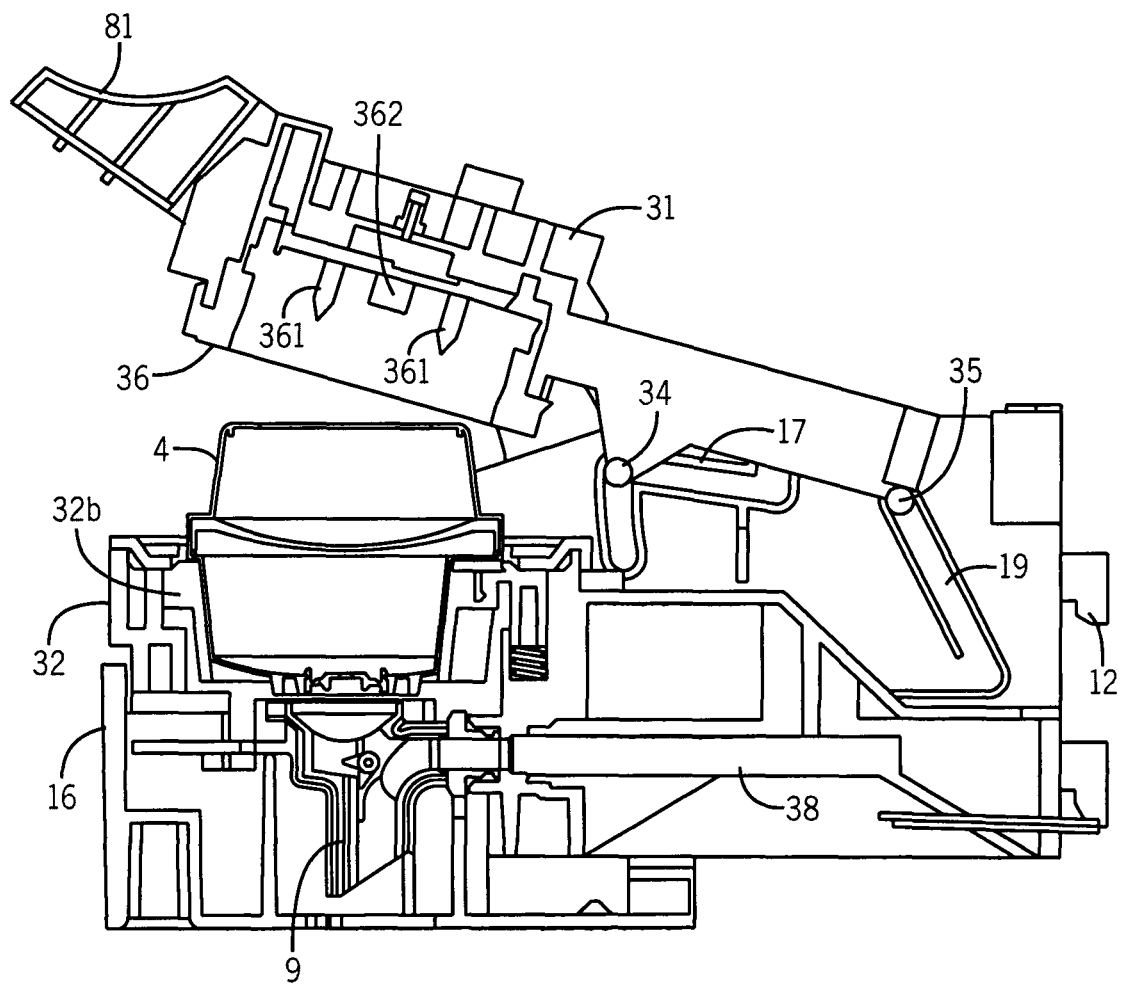
FIG. 6 shows a cross sectional view along the line 6-6 in FIG. 3.

FIG. 6 shows a cross sectional view of the cartridge holder along the line 6-6 in FIG. 3. As can be seen, in this embodiment, the upper portion 31 includes a cam follower—specifically forward and rear cam followers 34, 35—and the forward and rear cam followers 34, 35 engage with forward and rear cams 17, 19 of the frame 12. The shape of the cams 17, 19 and the location of the cam followers 34, 35 on the upper portion 31 cause the upper portion 31 to move pivotally in an initial phase of motion from an open position (i.e., where the rear cam follower 35 is located near or at a bottom of the forward cam 19 and the forward cam follower 34 is located at an upper-right location of the forward cam 17) toward a closed position (where the rear cam follower 35 is near an uppermost end of the rear cam 19 and the forward cam follower 34 is at a lower-left location of the forward cam 17). However, after an initial phase of pivotal movement of the upper portion 31 relative to the frame 12, the upper portion 31 may move linearly relative to the frame 12, e.g., as the upper portion 31 moves very close to the lower portion 32 to clamp the cartridge 4 in place. As can be seen, this arrangement allows the upper portion 31 to move generally upwardly from the closed position to disengage from the cartridge, and then slide rearwardly and pivot upwardly to the open position. This causes the upper portion 31 to move away from the cartridge receiving area 32a, allowing easier access to the area 32a. This motion of the upper portion 31 is driven by the actuator 8, but the connecting link 85 allows for guidance of the motion of the upper portion 31 to be controlled by the cam/cam follower engagement. To aid in better understanding of the shape of the cams 17, 19 in this embodiment, FIG. 7 shows a top perspective view of the lower portion 32 with the upper portion 31 removed. As can be seen, the rear cam 19 has a sloped, linear shape or arrangement, and the forward cam 17 has a S-shape. Other arrangements are possible regarding the cam shape. Moreover, it is possible to have a cam follower on the frame 12 and cam on the upper portion 31, if desired. Also, only a single cam and cam follower arrangement, rather than forward and rear cam/cam follower sets, may be used to guide movement of the upper portion 31.

In accordance with another aspect of the invention, the beverage making machine may have control circuitry arranged to activate a cartridge sensor to detect for the presence of a cartridge in the cartridge holder in response to movement of the upper portion from the open position, and the control circuitry may use information from the cartridge sensor only if the upper portion is detected to arrive at the closed position without returning to the open position after the cartridge sensor is activated. This may enable the machine to detect the presence of a cartridge prior to closure of the cartridge holder, yet ensure that the cartridge detector information is valid. For example, a user may place a cartridge in the cartridge holder and then begin closing the cartridge holder, causing activation of the cartridge sensor and the sensing of the presence of the cartridge. However, the user may decide not to make a beverage using the cartridge and allow the upper portion to move to the open position without ever arriving at the closed position. In this case, the control circuitry may disregard the cartridge sensor information because the upper portion returned to the open position. However, if the upper portion is moved from the open position to the closed position without returning to the open position, the cartridge sensor information regarding detection of the presence of the cartridge may be used. Thus, upon detecting that the cartridge holder is closed, the control circuitry may validate the cartridge sensor information and proceed with beverage production. By activating the cartridge sensor before the cartridge holder is actually closed, the control circuitry may shorten the amount of time the machine needs to verify that a cartridge is in place and ready the machine to prepare a beverage. Also, in some embodiments, the cartridge sensor may be able to distinguish between different types of cartridges and provide this information to the control circuitry. For example, the cartridge sensor may be able to detect whether a cartridge in the cartridge holder is suitable for use in making a carbonated beverage or not. If so, the control circuitry may control the machine to make a carbonated beverage, but otherwise the machine may be controlled to make a non-carbonated beverage.

Figure 8:
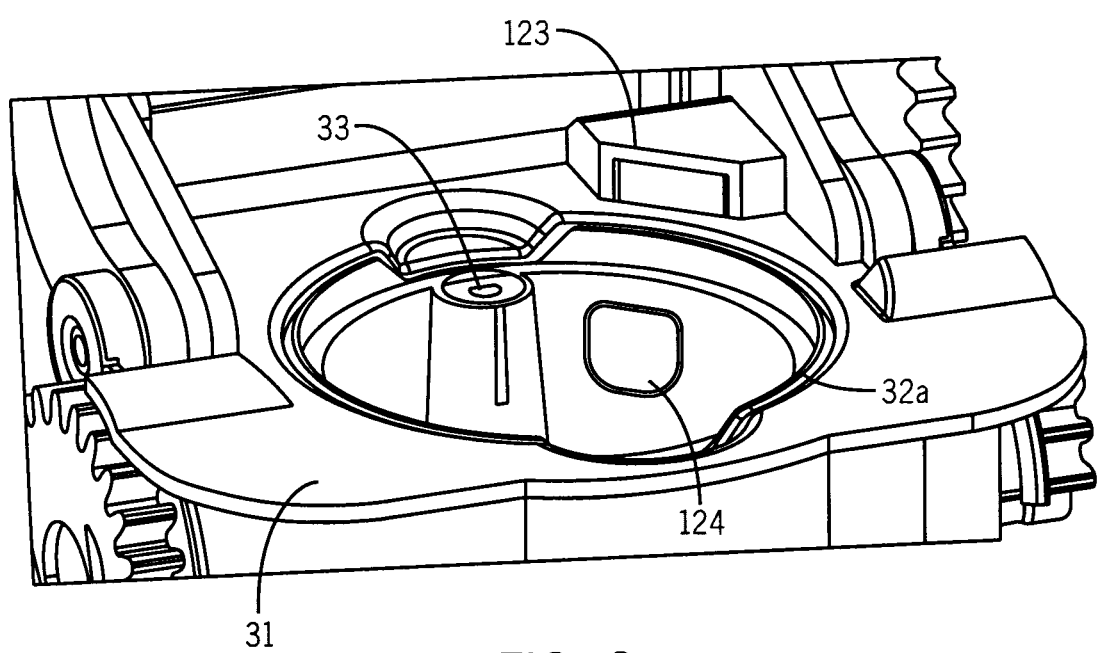
FIG. 8 shows a close up view of the cartridge receiving area of the cartridge holder.

As can be seen in FIG. 3, control circuitry for the machine 1 in this embodiment includes a pair of switches, i.e., an open position switch 121 and a closed position switch 122. Of course, the position of the upper portion 31 may be detected in other ways, but in this embodiment, the open position switch 121 is closed when a portion of the gear 82 contacts the open position switch 121 with the upper portion 31 in the open position. However, as the gear 82 is rotated to move the upper portion 31 away from the open position, the open position switch 121 opens, signaling to the control circuitry that the upper portion 31 has moved from the open position. In response, the control circuitry may activate a cartridge sensor to detect the presence or absence of a cartridge at the cartridge receiving area 32a. A cartridge 4 may be detected in a variety of ways, such as by a mechanical switch, optical sensor, etc., but in this embodiment, the cartridge sensor 123 includes an infrared light emitter and detector positioned adjacent the cartridge receiving area 32a (see FIG. 8). When activated, the cartridge sensor 123 emits an infrared light that is reflected by a cartridge 4, if present, and is detected by the sensor 123. If a cartridge 4 is not present, the light is not reflected and thus not detected by the sensor 123. Also, in some embodiments the infrared detector or other sensor may be able to distinguish between cartridge types, such as a cartridge to be used for making carbonated beverages or not. An infrared detector may make such a distinction based on detecting a feature on the cartridge, such as a reflective element, a size or shape feature of the cartridge, etc.

When the upper portion 31 arrives at the closed position, the closed position switch 122 is closed by a portion of the gear 82 contacting the switch 122. If the closed position switch 122 detects the upper portion 31 at the closed position after the cartridge sensor 123 is activated and the open position switch 121 has not detected the upper portion 31 at the open position after activation of the cartridge sensor 123, the control circuitry can use the cartridge sensor 123 information to control machine operation. For example, the detected presence of a cartridge 4 may allow the machine 1 to continue to prepare a beverage, whereas the absence of a cartridge 4 may cause the display of an error message or other prompt to a user. If however, the open position switch 121 detects the upper portion 31 at the open position after activation of the cartridge sensor 123, the control circuitry may disregard any information provided by the cartridge sensor 123. In some embodiments, an additional cartridge sensor may be employed, such as a second cartridge sensor 124 shown in FIG. 8. In this embodiment the second cartridge sensor 124 may detect whether a cartridge is authorized for use, e.g., carries a security ink, a specific marking, a properly encoded RFID tag, etc. This information may be used by the control circuitry to allow the machine to prepare a beverage using the cartridge or not.

In accordance with another aspect of the invention, the beverage making machine may include a mixing chamber arranged to receive beverage medium from a cartridge in the cartridge holder, to receive precursor liquid from a dispense line of the precursor liquid supply, and to mix the beverage medium and precursor liquid to form a beverage dispensed at a dispensing station of the machine. Moreover, the mixing chamber may be mounted to a drawer that is removable from the machine by sliding, with removal of the drawer from the machine disengaging the mixing chamber from the dispense line, and replacement of the drawer fluidly coupling the mixing chamber with the dispense line. This arrangement may allow for a convenient way to remove a mixing chamber for cleaning, replacement, or other purpose. For example, different mixing chambers may be used to prepare different beverages, e.g., one mixing chamber may provide a foaming action, while another mixing chamber may minimize foaming. By mounting the mixing chamber in a drawer, a user may avoid handling a potentially small and clumsy mixing chamber. In addition, mounting of the drawer on the machine 1 may be relatively easy to understand and perform for a user, whereas mounting of a mixing chamber alone may be difficult or confusing.

Figure 9:
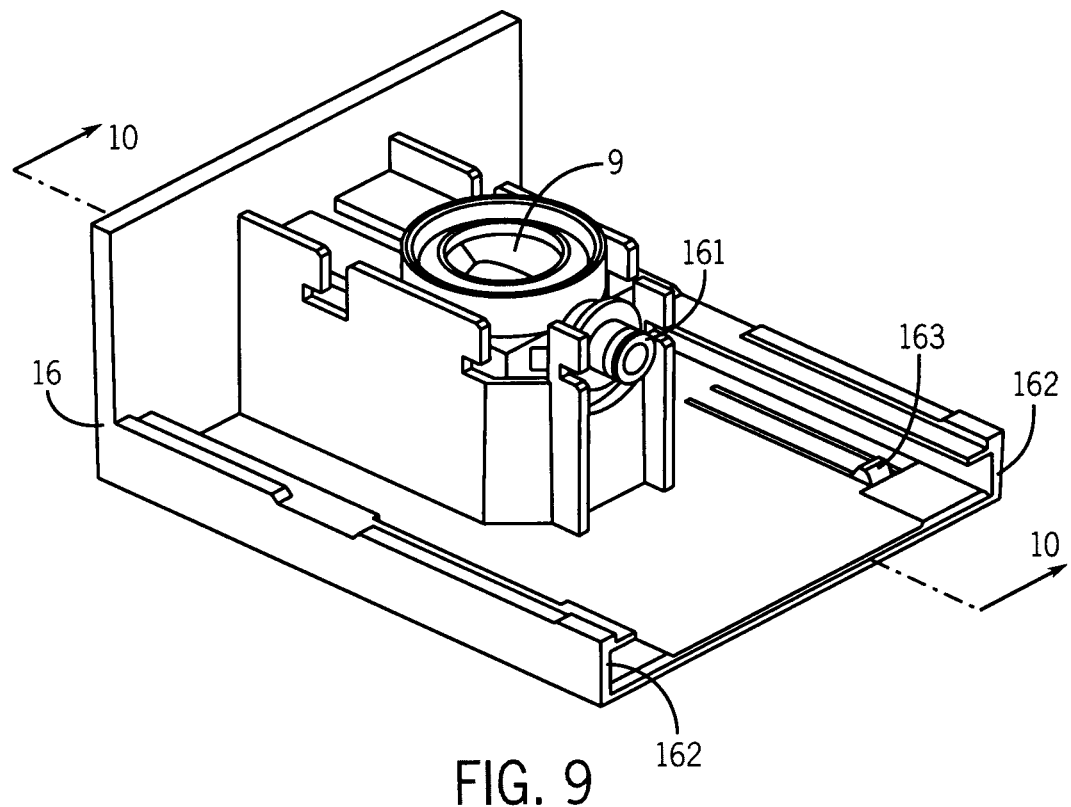
FIG. 9 shows a perspective view of a drawer of the cartridge holder including a mixing chamber.
Figure 10:
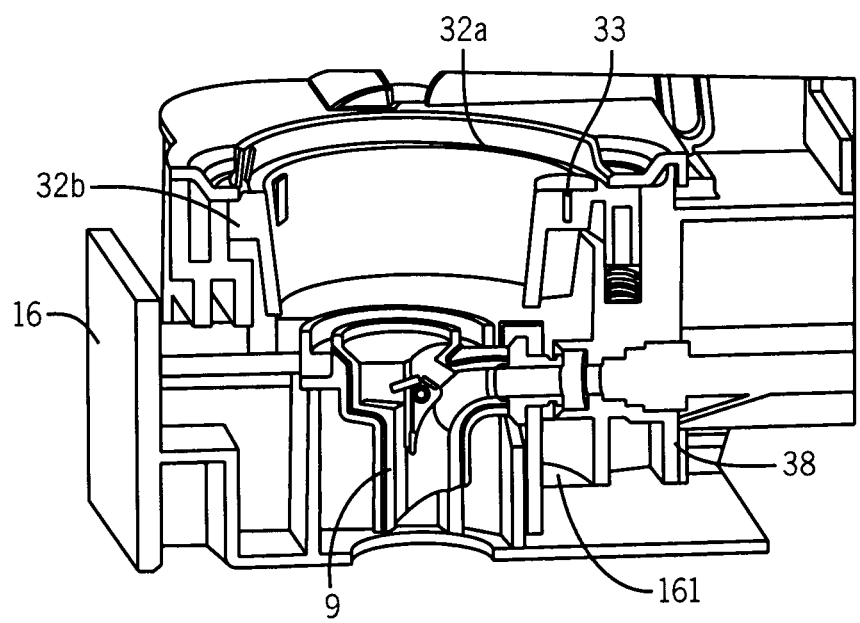
FIG. 10 shows a cross sectional view along the line 10-10 in FIG. 9.

FIGS. 3 and 6 show a drawer 16 slidably engaged with the lower portion 32 of the cartridge holder 3 and in the closed position so the mixing chamber 9 (not shown in FIG. 3) is in place to receive beverage medium from a cartridge 4 and to receive precursor liquid from a dispense line 38. FIG. 4, on the other hand, shows the drawer 16 in an open position in which the drawer 16 is disengaged from the lower portion 32. FIG. 9 shows a rear perspective view of the drawer 16 and illustrates a connector 161 that mates with the dispense line 38 when the drawer 16 is engaged with the lower portion 32. In this embodiment, the connector 161 includes a tube and o-ring gasket that fit inside of an end of the dispense line 38 to fluidly couple the mixing chamber 9 to the dispense line 38. However, other arrangements are possible. FIG. 9 also shows a pair of channels 162 of the drawer 16 that receive rails on the lower portion 32 and guide movement of the drawer 16 relative to the lower portion 32. A detent 163 may provide a locking feature that helps retain the drawer 16 in the closed position, as well as provide tactile feedback to a user to confirm that the drawer 16 is properly seated and the connector 161 is properly positioned to sealingly engage the dispense line 38. FIG. 10 shows a cross-sectional view along the line 10-10 in FIG. 9 and illustrates a condition when the drawer 16 is near, but not at, its closed position. As can be seen, the connector 161 is located just in front of a corresponding connector of the dispense line 38 and positioned such that the connector 161 is received into the dispense line 38 connector when the drawer 16 is pushed to the closed position. (FIG. 6 shows the drawer 16 in the closed position.)

Figure 11:
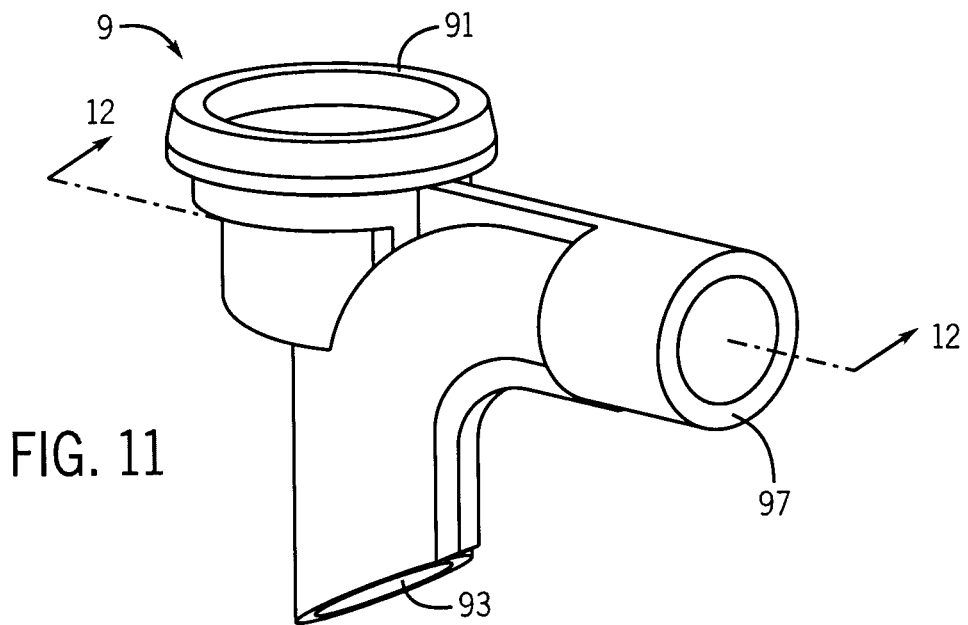
FIG. 11 shows a perspective view of a mixing chamber in an illustrative embodiment.
Figure 12:
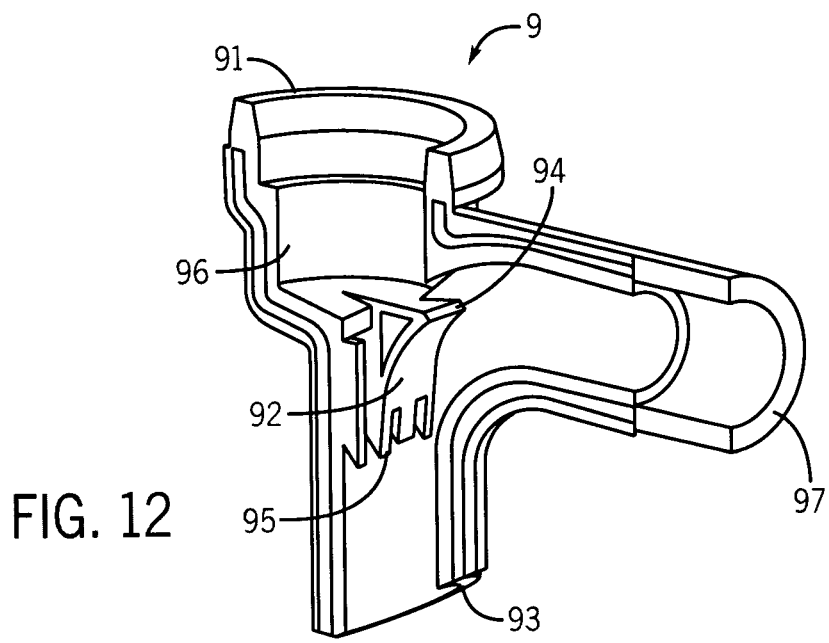
FIG. 12 shows a cross sectional view along the line 12-12 in FIG. 11.

FIGS. 11 and 12 show perspective views of a mixing chamber 9 that may be used with the beverage making machine 1. In this embodiment, the mixing chamber 9 has three main sections, i.e., a syrup chamber 96 that receives beverage medium from a cartridge 4, a precursor liquid inlet 97 that is coupled to the connector 161, and a dispense outlet 93 where precursor liquid and/or beverage medium are dispensed. Beverage medium (in this case a syrup) may exit the cartridge 4 and enter the syrup chamber 96 via pressurized gas or liquid introduced into the cartridge 4 that forces the syrup to leave the cartridge 4. The pressure in the cartridge 4 and in the syrup chamber 96 may also force the beverage medium to move to a syrup chamber outlet 95 where the beverage medium can flow to the dispense outlet 93. The syrup chamber outlet 95 may include multiple channels that lead downwardly from the syrup chamber 96, e.g., so that relatively thin streams of syrup pass to the dispense outlet 93. These thin streams of beverage medium may allow for faster mixing or other combination with precursor liquid that flows from the liquid inlet 97 to the dispense outlet 93. The syrup chamber 96 also has a syrup chamber inlet 94 that is in communication with the precursor liquid inlet 97. So long as relatively high pressure is present in the syrup chamber 96 (due to pressurized gas or liquid being introduced into the cartridge 4), precursor liquid will generally not enter the syrup chamber 96 via the syrup chamber inlet 94. However, once pressure in the syrup chamber 96 drops to a suitable level, precursor liquid may enter the syrup chamber 96 through the syrup chamber inlet 94. (As will be understood, the size, shape and/or position of the syrup chamber inlet 94 opening(s) may influence how, whether and when precursor liquid enters the syrup chamber 96.) Precursor liquid in the syrup chamber 96 may mix with any beverage medium that is present, as well as wash or rinse the syrup chamber 96 and syrup chamber outlet 95 of beverage medium. Accordingly, dispensing of beverage medium from the cartridge 4 may be suitably timed to start during flow of precursor liquid into the mixing chamber 9, and end before the flow of precursor liquid into the mixing chamber stops. In this way, the beverage medium may mix with precursor liquid as it is dispensed from the cartridge 4, and once beverage medium dispensing is complete, precursor liquid may rinse the syrup chamber 96 and syrup chamber outlet 95, e.g., so that little or no beverage medium is present in the syrup chamber 96 once beverage dispensing is complete.

As can be seen in FIGS. 11 and 12, the component that defines the mixing chamber 9 may also include an outlet piercing element that opens an outlet of a cartridge 4. That is, the mixing chamber 9 may include an annular rim 91 that functions to open an outlet of the cartridge, as discussed below. Moreover, the mixing chamber 9 may be removable from the drawer 16, e.g., for cleaning or replacement.

It should be understood that modifications to the illustrative embodiment above are possible. For example, the beverage medium could be driven from the cartridge 4 in other ways, such as by carbon dioxide gas pressure created by the cartridge 4, by gravity, by suction created by an adductor pump, venturi or other arrangement, etc., and the beverage medium may be dispensed directly into a user's cup where the precursor liquid is also introduced. Rinsing of the mixing chamber 9 may or may not be necessary, e.g., to help prevent cross contamination between beverages. In some arrangements, the entire volume of beverage medium may be discharged into the mixing chamber, causing initial amounts of flavored precursor liquid exiting the mixing chamber 9 to have a high beverage medium concentration. However, as the beverage medium is swept from the mixing chamber by the precursor liquid, the precursor liquid itself may effectively rinse the mixing chamber. In arrangements where the beverage medium is a dry material, such as a powder, some precursor liquid may be introduced into the cartridge to pre-wet the medium or otherwise improve an ability to mix the medium with precursor liquid. The wetted medium may be mixed with additional precursor liquid in the cartridge, or the wetted medium may be expelled from the cartridge, e.g., by air pressure, a plunger, etc., to a mixing chamber or other location for additional mixing with precursor liquid. Liquid may be introduced into a mixing chamber using multiple streams, e.g., to enhance a mixing rate using low flow speeds so as to reduce loss of dissolved gas.

Also, the mixing chamber 9 may take other suitable forms, e.g., may cause the precursor liquid and beverage medium to move in a spiral, swirl or other fashion to enhance mixing, may have one or more motor driven blades, impellers or other elements to mix contents in the chamber 9, and so on. The mixing chamber 9 may be cooled as well, e.g., by a refrigeration system, to help cool the beverage provided to the cup 18. Alternately, the precursor liquid supply 10 may be arranged to mix the precursor liquid with the beverage medium in the cartridge 4.

Figure 13:
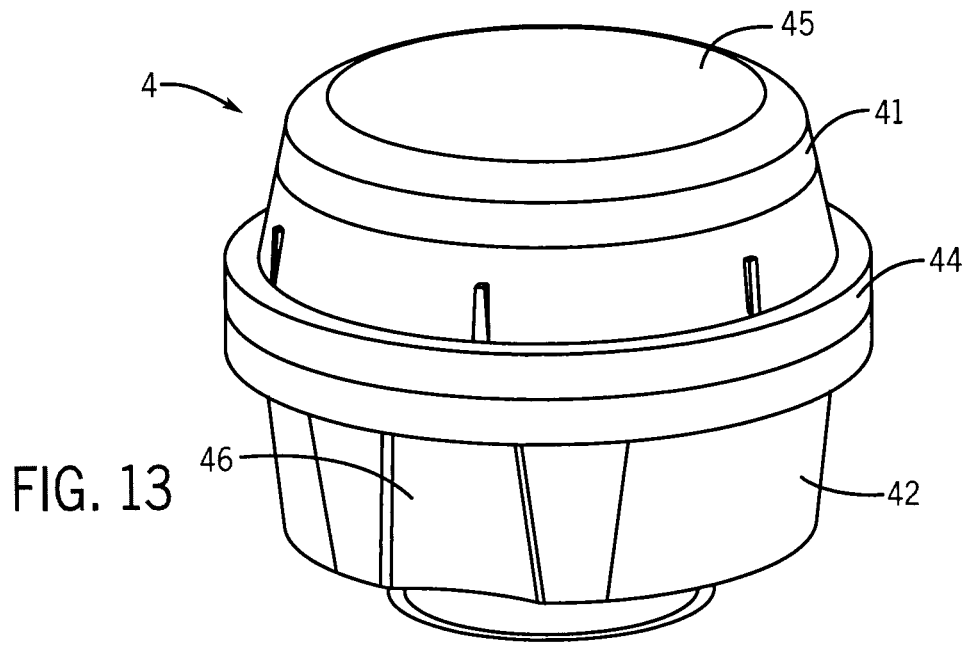
FIG. 13 shows a perspective view of a cartridge in an illustrative embodiment.
Figure 14:
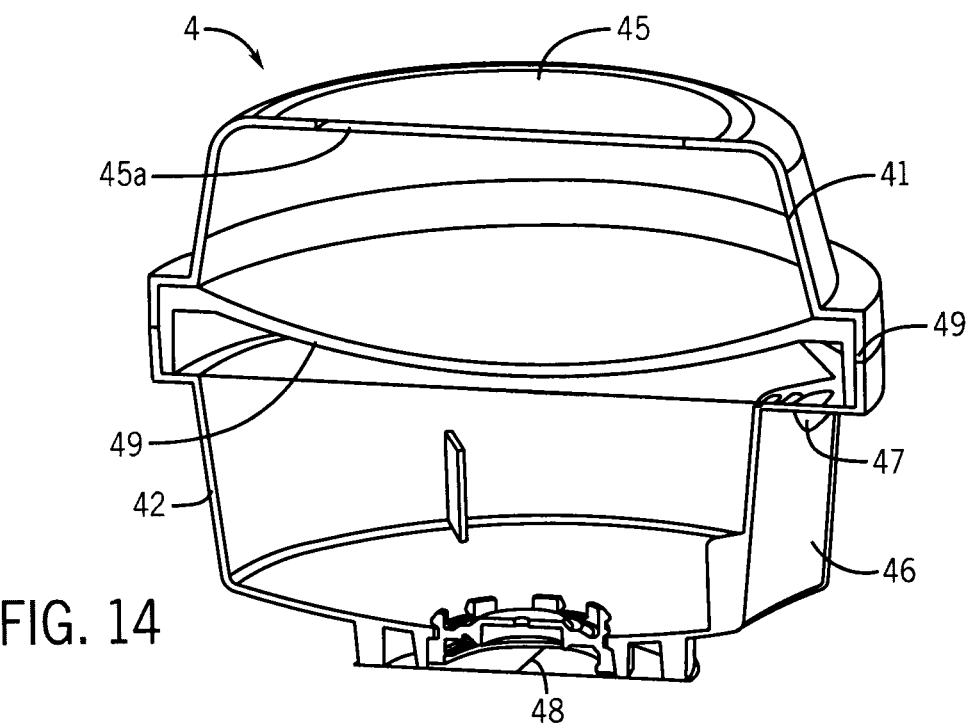
FIG. 14 shows a cross sectional view of the FIG. 13 cartridge.

While alternative cartridge configurations are possible, FIGS. 13 and 14 show a cartridge 4 that may be used with a beverage making system that employs the cartridge to carbonate a beverage precursor liquid and/or to provide a beverage medium mixed with precursor liquid to form a beverage. In this embodiment, the cartridge 4 includes a container that defines an upper compartment or chamber 41, a lower compartment or chamber 42, and a rim or band 44 between a top and bottom of the cartridge 4. The top of the cartridge 4 includes a lid 45 that covers an opening of the container. The lid 45 is pierceable to form one or more openings so as to access a gas source (not shown) in the upper compartment 41. (Although in this embodiment, the lid 45 is a separate element, such as a sheet of foil/polymer laminate attached to the container body, the lid may be molded or otherwise formed integrally with the body.) Also, a filter 45a may be positioned below the lid 45, e.g., spaced apart from the lid 45 but parallel to the lid 45, although other arrangements are possible. This filter 45a may help prevent gas source material from exiting the upper compartment 41 during gas production. The upper compartment 41 is also defined in part by a wall 49 that has a concave up curve, but such a shape is not necessary, e.g., the wall 49 may be flat or concave down.

The lower compartment or chamber 42 contains a beverage medium (not shown for clarity) that can be mixed with a precursor liquid to form a beverage. A pierceable inlet 47 may be located at an underside of the rim 44 and adjacent an indexing groove 46 formed in the lower sidewall of the cartridge 4. As is discussed in more detail below, the inlet 47 may be pierced to allow access to the lower compartment 42, e.g., so pressurized gas or liquid can be introduced into the lower compartment 42 to move the beverage medium out of an outlet 48 of the lower compartment 42. In this embodiment, the outlet 48 includes a pierceable membrane that can be pierced and opened to allow the beverage medium to exit, although other arrangements are possible, e.g., a self-closing septum valve or burstable seal may be provided at the outlet 48 that opens with increased pressure in the lower compartment 48. Cartridges are not limited to the arrangement shown in FIGS. 13 and 14, however, and other cartridge configurations, such as those that include only a gas source (e.g., only a rim 44 and upper compartment 41) to make a carbonated water, or those that include only a beverage medium (e.g., only a rim 44 and lower compartment 42), are possible. Where the upper or lower compartment 41, 42 is omitted, the compartment may be replaced by a flat wall that is flush with the rim 44, as an example.

In some embodiments, the cartridge 4 may contain a gas source material in the form of a plurality of beads of a molecular sieve. The gas source material may be a charged adsorbent or molecular sieve, e.g., a zeolite material that has adsorbed an amount of carbon dioxide gas that is released in the presence of water or other activating fluid, whether in vapor or liquid form. Note, however, that aspects of the invention are not necessarily limited to use with carbon dioxide gas, but may be used with any suitable gas, such as nitrogen, which is dissolved in some beers or other beverages, oxygen, air, and others. Thus, reference to "carbonation", "carbon dioxide source" "carbon dioxide activating fluid supply", etc., should not be interpreted as limiting aspects of the invention and/or any embodiments to use with carbon dioxide only. Instead, aspects of the invention may be used with any suitable gas.

In one embodiment, the charged adsorbent is a zeolite such as analcime, chabazite, clinoptilolite, heulandite, natrolite, phillipsite, or stilbite along with a suitable binder or filler component, e.g., to help form the zeolite into a desired shape. The zeolite may be naturally occurring or synthetic, and may be capable of holding up to about 20% carbon dioxide by weight or more. The zeolite material may be arranged in any suitable form, such as a solid block (e.g., in disc form), particles of spherical, cubic, irregular or other suitable shape, and others.

The cartridge 4 container may be made of any suitable materials, and is not necessarily limited to the constructions shown herein. For example, the cartridge may be made of, or otherwise include, materials that provide a barrier to moisture and/or gases, such as oxygen, water vapor, etc. In one embodiment, the cartridge may be made of a molded polymer or polymer laminate, e.g., formed from a sheet including a layer of polystyrene, polypropylene and/or a layer of EVOH and/or other barrier material, such as a metallic foil. Moreover, the cartridge materials and/or construction may vary according to the materials contained in the cartridge. For example, a portion of the cartridge 4 containing a gas source material may require a robust moisture barrier, whereas a beverage medium portion may not require such a high moisture resistance. Thus, the cartridges may be made of different materials and/or in different ways. In addition, the cartridge interior may be differently constructed according to a desired function. For example, where beverage medium is mixed with precursor liquid in the cartridge, a beverage medium cartridge portion may include baffles or other structures that cause the liquid/beverage medium to follow a tortuous path so as to encourage mixing. The gas source cartridge portion may be arranged to hold the gas source in a particular location or other arrangement in the interior space, e.g., to help control wetting of the gas source with activating liquid. Thus, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material). The cartridge may be impervious to air and/or liquid, or may allow water and/or air to pass into the cartridge.

A cartridge may also be arranged to provide a visual or other detectable indication regarding the cartridge's fitness for use in forming a beverage. For example, the cartridge may include a pop-up indicator, color indicator or other feature to show that the gas source has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

In one aspect of the invention, the cartridge or cartridges used by the beverage making system to form a beverage may have a volume that is less, and in some cases substantially less, than a beverage to be made using the cartridge(s). For example, a cartridge may have upper and lower compartments 41, 42 that each has a volume that is about 50 ml or less, and yet can be used to form a beverage having a volume of about 200-500 ml or more. In some embodiments, an amount of charged adsorbent (e.g., a charged zeolite) of about 10-50 grams (which has a volume of less than 50 ml) can be used to produce about 300-1000 ml of carbonated water having a carbonation level of up to about 4-5 volumes. Moreover, it is well known that beverage-making syrups or powders having a volume of less than about 50 ml, or less than about 100 ml, can be used to make a suitably flavored beverage having a volume of about 300-500 ml. Thus, relatively small volume cartridges (or a single cartridge in some arrangements) having a volume of about 100 ml to about 250 ml or less may be used to form a carbonated beverage having a volume of about 100 to 1000 ml, and a carbonation level of at least about 1 to 4 volumes in less than 120 seconds, e.g., about 60 seconds, and using pressures under 80 psi.

The cartridge holder 3 may engage the cartridge 4 in a variety of different ways, and in this illustrative embodiment, the lower portion 32 of the cartridge holder 3 includes a basket 32b that defines the cartridge receiving area 32a (see FIGS. 6 and 10). The cartridge 4 may be received in the basket 32b so that the rim 44 rests on an upper ledge or surface of the basket 32b so the basket 32b supports the weight of the cartridge 4 prior to closure of the cartridge holder 3. With the cartridge 4 in the basket 32b, the upper portion 31 of the cartridge holder 3 may move downwardly to clamp the cartridge 4 in place, e.g., to house the upper compartment 41 in a sealed space. In this embodiment, the upper portion 31 of the cartridge holder includes a piston 36 (see FIG. 6) that can move vertically in a cavity of the upper portion 31 and is arranged to contact the cartridge rim 44 and clamp downwardly on the rim 44 to form a seal between the piston 36 and the rim 44. In this embodiment, a wave spring or other resilient element (not shown) urges the piston 36 to move downwardly relative to the upper portion 31, but deforms somewhat with contact with the rim 44 of the cartridge 4 to allow the piston 36 to move into the cavity. The piston 36 may have one or more gaskets, e.g., an o-ring, that engages the wall of the cavity so that the piston 36 and other parts of the upper portion 31 define a pressure-tight space in which the upper compartment 41 of the cartridge 4 can be held. This way, pressurized gas released by the cartridge 4 may be prevented from leaking from the cavity, and can be used to carbonate a beverage. Also, the piston 36 may be movable vertically in the cavity such that as pressure builds in the cavity, the gas pressure tends to push the piston 36 downwardly and out of the cavity. This action can help the piston 36 clamp the cartridge 4 more tightly at the rim 44, helping to improve a seal between the piston 36 and cartridge 4 as the pressure increases.

As the upper portion 31 is moved to the closed position, the upper compartment 41 of the cartridge 4 may be received into the piston 36 and the cavity in which the piston 36 is located until the piston 36 urges the cartridge 4 to move downwardly toward the lower portion 32 of the cartridge holder 3. This downward movement can cause two actions, i.e., piercing of the inlet 47 and the outlet 48 of the lower compartment 42. That is, the basket 32b may be spring biased to move upwardly and remain in an upper position with the cartridge 4 initially placed in the basket 32b, but moves downwardly as the cartridge holder is closed. Thus, the clamping force of the upper portion 31 of the cartridge holder (e.g., the piston 36) can overcome the spring bias on the basket 32b, causing the basket 32b and the cartridge 4 to move downwardly relative to the lower portion 32. This downward movement may cause a dispense gas piercing element 33 (see FIGS. 7 and 8) to contact the cartridge at the inlet 47 and pierce the inlet 47 so that the dispense gas piercing element 33 can deliver pressurized gas into the lower compartment 42. (A gasket or other seal at the piercing element 33 can engage the cartridge 4 at the inlet 47 to form a leak-resistant connection at the inlet 47. As will also be understood, the dispense gas piercing element 33 may be connected to a line that provides pressurized gas, e.g., from an air pump 43—see FIG. 15.) In accordance with an aspect of the invention, the cartridge may be pierced at an underside of the rim 44 to provide an opening through which pressurized gas or liquid can be introduced to move beverage medium out of the lower compartment 42. Since the rim 44 may be made relatively robustly to establish a desired seal with the cartridge holder and to oppose a piercing force of the piercing element 33, a remainder of the cartridge 4 may be made out of relatively weak or less robust material or construction, e.g., to reduce cost and/or weight of the cartridge. Thus, the cartridge may be arranged to allow for reliable piercing for introduction of pressurized gas into the lower compartment 42 and sealing with the cartridge holder at the rim 44, yet still keep materials requirements to a minimum.

Downward movement of the cartridge 4 and basket 32b may also cause an outlet piercing element (e.g., the annular rim 91 of the mixing chamber 9) to contact the pierceable membrane or other cartridge portion at the outlet 48 so that the outlet 48 is opened. In this embodiment, the outlet piercing element is received into an annular groove of the cartridge 4 above the pierceable membrane at the outlet 48. Movement of the annular rim into the groove stresses the pierceable membrane such that the membrane, which may be scored or otherwise have a line of weakness that defines a preferential opening area, is pierced and pulled back so the outlet 48 can dispense beverage medium to the mixing chamber 9.

Downward movement of the upper portion of the cartridge holder 3 may also cause piercing of the cartridge lid 45 or other action such that the upper compartment 41 can be accessed. In this illustrative embodiment, the upper portion 31 includes a pair of piercing elements 361 arranged to pierce the lid 45 to introduce activating fluid into the upper compartment 41, and a piercing element 362 arranged to pierce the lid 45 to allow gas emitted by the gas source to exit the cartridge 4. Though not necessary, the piercing elements 361 are arranged to penetrate through the lid 45 and the filter 45a so that activating fluid can be introduced below the filter 45a. However, the piercing element 362 is arranged to pierce only the lid 45, but not the filter 45a. In this way, gas emitted in the upper compartment 41 must pass through the filter 45a before exiting to the carbonating gas supply. This may help prevent gas source material, such as zeolite particles, from exiting the cartridge 4 and passing to the carbonating gas supply 30. A variety of arrangements are possible for the filter 45a, such as a piece of filter paper mentioned above, a hydrophobic non-woven material that permits gas to pass, but resists liquid passage, or other element that permits gas to exit the cartridge 4, but resists movement of gas source material and/or liquid. In addition or alternately to the filter 45a, a conduit that receives the carbonating gas may include a filter element, such as a filter plug in the conduit, to help further resist movement of gas source materials to the carbonation tank 6. The piercing elements, may include a hollow needle, spike, blade, knife or other arrangement, to form a suitable opening in the cartridge 4. In this embodiment, the piercing elements 361 include tubular elements with an activating fluid discharge opening at a distal end such that activating fluid can be released from the piercing elements 361 below the filter 45a. In contrast, the piercing element 362 is relatively dull so as to penetrate the lid 45, but not the filter 45a. Alternately, the cartridge 4 may have defined openings, e.g., one or more ports that include a septum or other valve-type element that permits flow into and/or out of the cartridge 4. Also, a movable guard element may be provided to help resist contact of a user's fingers with the piercing elements, e.g., a spring loaded plate may be mounted inside of the piston 36 and arranged to conceal the piercing elements when the upper portion 31 is open, but retracts so the piercing elements extend through the plate to penetrate the cartridge 4 when the upper portion is closed.

Figure 15:
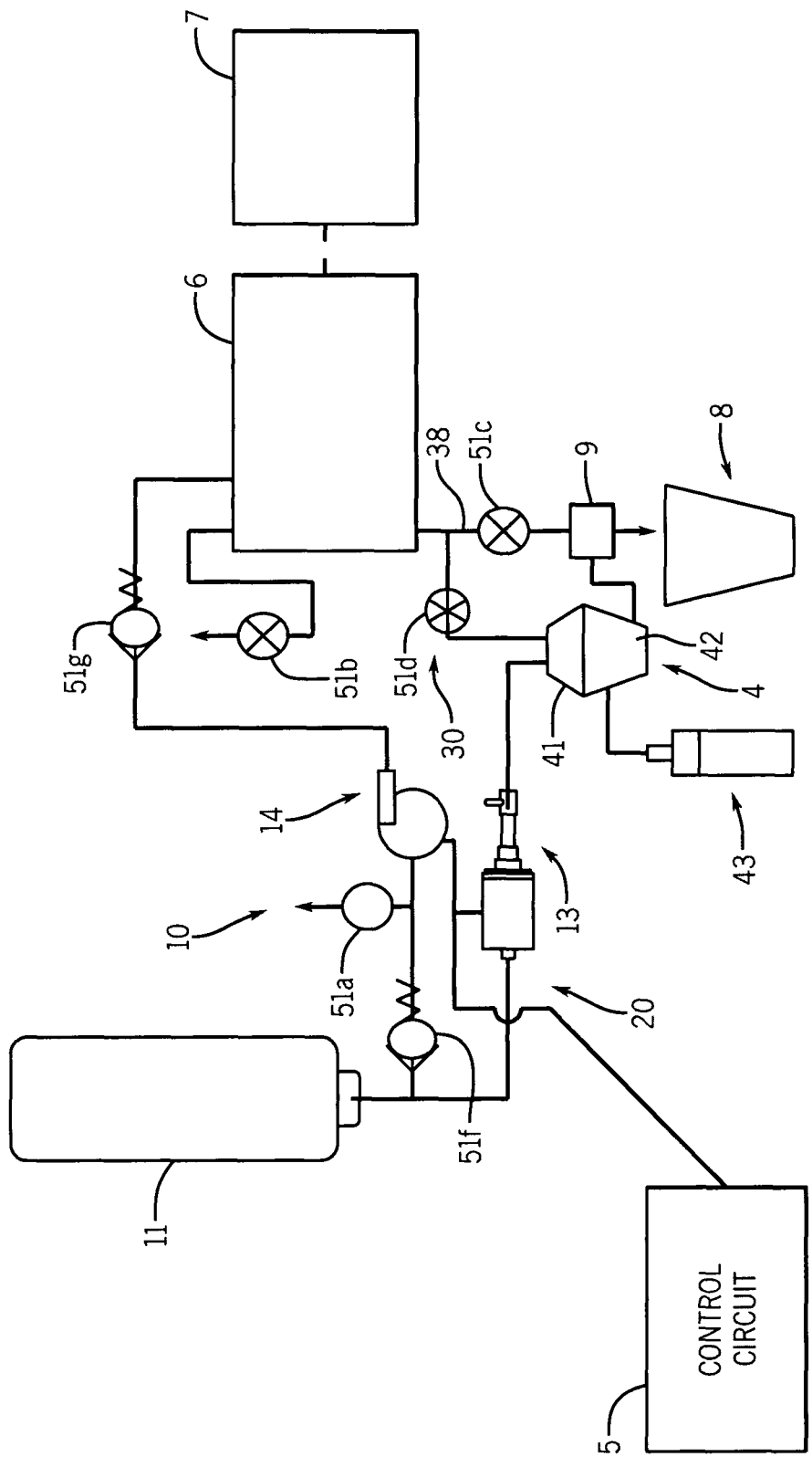
FIG. 15 shows a schematic diagram of components of a beverage making system in an illustrative embodiment.

While a beverage making machine 1 may employ different liquid and gas flow path arrangements, FIG. 15 shows one such arrangement that may be used in the beverage making machine 1. In this embodiment, precursor liquid provided by a precursor liquid supply 10 originates in the reservoir 11, which may be removable from the machine 1, e.g., to allow for easier filling, or may be fixed in place. Although in this embodiment a user initially provides the beverage precursor liquid in the reservoir 11, the precursor supply 10 may include other components to provide liquid to the reservoir 11, such as a plumbed water line, controllable valve, and liquid level sensor to automatically fill the reservoir 11 to a desired level, a second water reservoir or other tank that is fluidly connected to the reservoir 11, and other arrangements. Liquid is delivered by a pump 14 to a carbonation tank 6 via a check valve 51f upstream of the pump 14 and a check valve 51g downstream of the pump 14. The check valves 51f, 51g may help prevent backflow from the carbonation tank 6, e.g., when the tank 6 is relatively highly pressurized during the carbonating process. In this instance, the pump 14 is a diaphragm pump, but other pump types are possible. The carbonation tank 6 may be suitably filled with liquid using any suitable control method, such as by sensing a level in the tank 6 using a conductive probe, pressure sensor, optical sensor or other sensor. A tank vent valve 51b may be opened during filling to allow the pressure in the tank 6 to vent, or may remain closed during filling, e.g., to allow a pressure build up in the tank 6. An activating fluid supply 20 which includes a pump 13 is arranged to provide activating fluid to the upper compartment of a cartridge 4, i.e., to cause the gas source material to release gas to the carbonation tank 6. Gas emitted by the cartridge 4 is routed to the tank 6 via a valve 51d. A control circuit 5 may control operation of the valves 51, e.g., the valves 51 may include electromechanical or other actuators, as well as include sensors to detect various characteristics, such as temperature in the tank 6, pressure in the tank 6, a flow rate of gas or liquid in any of the system flow lines, etc.

To form a beverage, a user may associate a cartridge 4 with the machine 1, e.g., by loading the cartridge 4 into a cartridge holder 3. Of course, a cartridge may be associated with the machine 1 in other ways, such as by screwing a portion of the cartridge into engagement with the machine 1, etc. With the cartridge 4 associated with the machine 1, the control circuit 5 may then activate the machine 1 to deliver liquid to the cartridge 4, e.g., to cause carbon dioxide to be generated. (Though this embodiment uses a cartridge with a gas source activated by a fluid, other arrangements are possible.) The control circuit 5 may start operation of the machine 1 in an automated way, e.g., based on detecting the presence of a cartridge 4 in the holder 3, detecting liquid in the carbonation tank 6 and closure of the holder 3, and/or other characteristics of the machine 1. Alternately, the control circuit 5 may start system operation in response to a user interacting with an interface 52, e.g., pressing a start button or otherwise providing input (e.g., by voice activation) to start beverage preparation.

To initiate carbonation after the tank is provided with a suitable amount of precursor liquid, the vent valve 51b may be closed and the pump 13 controlled to pump liquid into the upper compartment 41 of a cartridge 4 that contains a gas source. That is, the machine 1 may include a carbon dioxide activating fluid supply 20 that provides a fluid, e.g., in a controlled volume, at a controlled rate or otherwise to control a gas production rate, to a cartridge 4 so as to activate a carbon dioxide source in the upper compartment 41 to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Other arrangements or additions are possible for the carbon dioxide activating fluid supply 20, such as a dedicated liquid supply for the cartridge 4 that is separate from the precursor liquid supply, a pressure-reducing element in the conduit, a flow-restrictor in the conduit, a flow meter to indicate an amount and/or flow rate of fluid into the cartridge 4, a syringe, piston pump or other positive displacement device that can meter desired amounts of liquid (whether water, citric acid or other material) to the cartridge 4, and others. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4.

A carbon dioxide gas supply 30 may be arranged to provide carbon dioxide gas from the cartridge 4 to an area where the gas is used to carbonate the liquid, in this case, the carbonation tank 6. The gas supply 30 may be arranged in any suitable way, and in this illustrative embodiment includes a conduit that is fluidly connected between the cartridge 4 and a carbonated liquid outlet of the carbonation tank 6. A gas control valve 51d is controllable by the control circuit 5 to open and close the flow path through the gas supply conduit. (Note that in some embodiments, the valve 51d may be a check valve that is not controllable by the control circuit 5.) In accordance with an aspect of the invention, the carbonation gas is delivered via a carbonating gas supply line that is fluidly coupled to the dispense line of the carbonation tank so as to deliver carbon dioxide gas to the outlet of the carbonation tank to carbonate the precursor liquid. This arrangement may provide advantages, such as introducing the carbonating gas at a relatively low point in the tank, which may help increase contact of the gas with the precursor liquid, thereby enhancing dissolution of the gas. In addition, the flow of carbonating gas through at least a portion of the dispense line 38 may help purge the dispense line 38 of liquid, helping to re-carbonate the liquid, if necessary. The gas conduit may be connected to the dispense line 38 close to the dispense valve 51e so as to purge as much liquid from the dispense line 38 as possible.

The gas supply 30 may include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. (The use of an accumulator or similar gas storage device may obviate the need to control the rate of gas output by a cartridge. Instead, the gas source may be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) Also, carbonation of the precursor liquid may occur via one or more mechanisms or processes, and thus is not limited to one particular process. For example, while delivery of carbon dioxide gas to the outlet of the carbonation tank 6 may function to help dissolve carbon dioxide in the liquid, other system components may further aid in the carbonation process. In some embodiments, a sparger may be used to introduce gas into the carbonation tank, precursor liquid may be circulated in the tank, and/or other techniques may be used to alter a rate at which carbonating gas is dissolved.

Before, during and/or after carbonation of the liquid in the carbonation tank 6, a cooling system 7 may chill the liquid. The cooling system 7 may operate in any suitable way, e.g., may include ice, refrigeration coils or other cooling elements in thermal contact with the carbonation tank 6. In addition, the carbonation tank 6 may include a mixer or other agitator to move the liquid in the tank 6 to enhance gas dissolution and/or cooling. Operation in forming a beverage may continue for a preset amount of time, or based on other conditions, such as a detected level of carbonation, a drop in gas production by the cartridge 4, or other parameters. During operation, the amount of liquid provided to the cartridge 4 may be controlled to control gas output by the cartridge 4. Control of the liquid provided to the cartridge 4 may be made based on a timing sequence (e.g., the pump may be operated for a period of time, followed by stoppage for a period, and so on), based on detected pressure (e.g., liquid supply may be stopped when the pressure in the tank 6 exceeds a threshold, and resume when the pressure falls below the threshold or another value), based on a volume of activating liquid delivered to the holder 3 (e.g., a specific volume of liquid may be delivered to the cartridge 4 in one or more discrete volumes), or other arrangements.

With the precursor liquid in the carbonation tank 6 ready for dispensing, the vent valve 51b may be opened to reduce the pressure in the carbonation tank 6 to an ambient pressure. As is known in the art, depressurizing the carbonation tank prior to dispensing may aid in maintaining a desired carbonation level of the liquid during dispensing. With the tank 6 vented, the vent valve 51b may be closed and a pump vent valve 51a may be opened. The pump 14 may then be operated to draw air or other gas into the inlet side of the pump 14 and pump the gas into the carbonation tank 6 so as to force the precursor liquid in the tank 6 to flow into the dispense line 38. That is, the arrangement of FIG. 15 incorporates another aspect of the invention in that a single pump may be used to both deliver precursor liquid to a carbonation tank or other carbonation location as well as deliver pressurized gas (air) to the carbonation tank to dispense carbonated liquid from the tank. This feature, optionally combined with the feature of using the same pump to deliver activating fluid to a gas source, may make for a simplified system with fewer components. While the pump 14 delivers air to the carbonation tank, the dispense valve 51e is opened and the gas valve 51d is closed during liquid dispensing. The dispensed liquid may enter a mixing chamber 9 at which the carbonated liquid and beverage medium provided from the lower compartment 42 of the cartridge 4 are combined. The beverage medium may be moved out of the cartridge 4 and to the mixing chamber 9 by introducing pressurized gas into the lower compartment 42, e.g., by way of an air pump 43. Other arrangements are possible, however, such as routing gas from the upper compartment 41 under pressure to the lower compartment 42.

The beverage medium may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium.)

The control circuit 5 may use one or more sensors to control a carbonation level of the precursor liquid, a temperature to which the liquid is chilled (if at all), a time at which and during which beverage medium is delivered to the mixing chamber 9, a rate at which carbonating gas is produced and delivered to the tank 6, and/or other aspects of the beverage making process. For example, a temperature sensor may detect the temperature of the precursor liquid in the carbonation tank 6. This information may be used to control system operation, e.g., warmer precursor liquid temperatures may cause the control circuit 5 to increase an amount of time allowed for carbon dioxide gas to be dissolved in the precursor liquid. In other arrangements, the temperature of the precursor liquid may be used to determine whether the machine 1 will be operated to carbonate the liquid or not. For example, in some arrangements, the user may be required to add suitably cold liquid (and/or ice) to the reservoir 11 before the machine 1 will operate. (As discussed above, relatively warm precursor liquid temperatures may cause the liquid to be insufficiently carbonated in some conditions.) In another embodiment, a pressure sensor may be used to detect a pressure in the carbonation tank 6. This information may be used to determine whether the carbonation tank 6 is properly or improperly filled, if a pressure leak is present, if carbonation is complete and/or to determine whether sufficient carbon dioxide gas is being produced by the cartridge 4. For example, low detected pressure may indicate that more carbon dioxide needs to be generated, and thus cause the control circuit 5 to allow more liquid to be delivered by the activating fluid supply 20 to the cartridge 4. Likewise, high pressures may cause the flow of liquid from the activating fluid supply 20 to be slowed or stopped. Thus, the control circuit 5 can control the gas pressure in the carbonation tank 6 and/or other areas of the machine 1 by controlling an amount of liquid delivered to the cartridge 4. Alternately, low pressure may indicate that there is a leak in the system and cause the system to indicate an error is present. In some embodiments, measured pressure may indicate that carbonation is complete. For example, pressure in the tank 6 may initially be detected to be at a high level, e.g., around 70-80 psi, and later be detected to be at a low level, e.g., around 40 psi due to gas being dissolved in the liquid. The low pressure detection may indicate that carbonation is complete. A sensor could also detect the presence of a cartridge 4 in the cartridge holder 3, e.g., via RFID tag, optical recognition as discussed above, physical sensing, etc. If no cartridge 4 is detected, or if the control circuit 5 detects that the cartridge 4 is spent, the control circuit 5 may prompt the user to insert a new or different cartridge 4. For example, in some embodiments, a single cartridge 4 may be used to carbonate multiple volumes of precursor liquid. The control circuit 5 may keep track of the number of times that the cartridge 4 has been used, and once a limit has been reached (e.g., 10 drinks), prompt the user to replace the cartridge. Other parameters may be detected by a sensor, such as a carbonation level of the precursor liquid (which may be used to control the carbonation process), the presence of a suitable vessel to receive a beverage discharged from the machine 1 (e.g., to prevent beverage from being spilled), the presence of water or other precursor liquid in the carbonation tank 6 or elsewhere in the precursor supply 10, a flow rate of liquid in the pump 13 or associated conduit, the presence of a headspace in the carbonation tank 6 (e.g., if no headspace is desired, a valve may be activated to discharge the headspace gas, or if only carbon dioxide is desired to be in the headspace, a snifting valve may be activated to discharge air in the headspace and replace the air with carbon dioxide), and so on.

The control circuit 5 may also be arranged to allow a user to define a level of carbonation (i.e., amount of dissolved gas in the beverage, whether carbon dioxide or other). For example, the control circuit 5 may include a touch screen display or other user interface 52 that allows the user to define a desired carbonation level, such as by allowing the user to select a carbonation volume level of 1, 2, 3, 4 or 5, or selecting one of a low, medium or high carbonation level. Cartridges used by the machine 1 may include sufficient gas source material to make the highest level of carbonation selectable, but the control circuit 5 may control the system to dissolve an amount of gas in the beverage that is consistent with the selected level. For example, while all cartridges may be arranged for use in creating a "high" carbonation beverage, the control circuit 5 may operate the machine 1 to use less of the available gas (or cause the gas source to emit less gas than possible) in carbonating the beverage. Carbonation levels may be controlled based on a detected carbonation level by a sensor, a detected pressure in the carbonation tank 6 or elsewhere, an amount of gas output by the cartridge 4, or other features.

In another embodiment, the cartridge 4 may include indicia readably by the controller, e.g., an RFID tag, barcode, alphanumeric string, etc., that indicates a carbonation level to be used for the beverage. After determining the carbonation level from the cartridge 4, the control circuit 5 may control the machine 1 accordingly. Thus, a user need not select the carbonation level by interacting with the machine 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the machine 1. Thus, a gas source cartridge labeled "low" may be chosen and used with the system to create a low level carbonated beverage.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage making machine, comprising:
   a cartridge holder arranged to hold a cartridge containing a material used by the beverage making machine to form a beverage, the cartridge holder including,
   a lower portion arranged to receive and hold the cartridge placed at a cartridge receiving area of the lower portion,
   an upper portion movable relative to the lower portion between an open position in which the cartridge receiving area is exposed for placement of the cartridge and a closed position in which the upper and lower portions enclose the cartridge to access material in the cartridge to form the beverage, and
   an actuator arranged to move the upper portion between the open and closed positions, the upper portion being arranged to move pivotally relative to the lower portion during an initial phase of movement from the open position toward the closed position, and being arranged to move linearly relative to the lower portion during a later phase of movement from the open position toward the closed position; and
   a precursor liquid supply to provide precursor liquid used to form the beverage using the material in the cartridge.

2. The machine of claim 1, further comprising a frame arranged to support components of the beverage making machine including the precursor liquid supply, the frame having a cam or cam follower,
   wherein the upper portion includes the other of a cam or cam follower arranged to engage with the cam or cam follower of the frame, wherein movement of the upper portion relative to the frame causes the other of the cam or cam follower of the upper portion to move relative to the cam or cam follower of the frame thereby causing the upper portion to move pivotally relative to the frame during the initial phase of movement and to move linearly relative to the frame during the later phase of movement.

3. The machine of claim 2, wherein:
the cam or cam follower of the frame includes a cam; and
the other of the cam or cam follower of the upper portion includes a cam follower arranged to engage with the cam of the frame.

4. The machine of claim 3, wherein the upper portion includes forward and rear cam followers arranged to engage, respectively, with forward and rear cams of the frame.

5. The machine of claim 1, further comprising a frame arranged to support components of the beverage making machine including the precursor liquid supply,
wherein the actuator includes a handle pivotally mounted to the frame and having a handle gear arranged to drive movement of the upper portion with movement of the handle.

6. The machine of claim 5, wherein the actuator further includes a spur gear having a strut, the spur gear being pivotally mounted to the frame and engaged with the handle gear such that movement of the handle causes rotation of the spur gear, and
a link connected at a first end to the strut and connected at a second end to the upper portion such that rotation of the spur gear causes movement of the upper portion relative to the frame.

7. The machine of claim 5, further comprising a detent that operates to retain the handle at a position corresponding to the open position for the upper portion and at a position corresponding to the closed position for the upper portion.

8. The machine of claim 1, wherein the upper portion includes a piston arranged for axial movement relative to the upper portion, the upper portion and the piston defining a pressure chamber arranged to receive a portion of the cartridge and such that pressure in the pressure chamber causes the piston to move downwardly relative to the upper portion and exert a clamping force on the cartridge.

9. The machine of claim 1, wherein the upper portion is arranged to clamp the cartridge in place so as to force a bottom of the cartridge into an opening structure that causes an outlet at the bottom of the cartridge to open.

10. The machine of claim 1, wherein the lower portion includes a basket to receive the cartridge, and wherein the basket is movable in a vertical direction relative to the lower portion.

11. The machine of claim 10, wherein the basket is spring biased to move upwardly.

12. A beverage making machine, comprising:
a frame arranged to support components of the beverage making machine, the frame having a forward cam or cam follower and a rear cam or cam follower;
a cartridge holder supported by the frame and arranged to hold a cartridge containing a material used by the beverage making machine to form a beverage, the cartridge holder including, a lower portion arranged to receive and hold the cartridge placed at a cartridge receiving area of the lower portion,
an upper portion having a forward cam follower or cam arranged to engage with the forward cam or cam follower of the frame and a rear cam follower or cam arranged to engage with the rear cam or cam follower of the frame, engagement of the forward and rear cams and cam followers controlling movement of the upper portion relative to the frame between an open position in which the cartridge receiving area is exposed for placement of the cartridge and a closed position in which the upper and lower portions enclose the cartridge to access material in the cartridge to form the beverage, and
an actuator arranged to move the upper portion between the open and closed positions; and
a precursor liquid supply to provide precursor liquid used to form the beverage using the material in the cartridge.

13. The machine of claim 12, wherein the upper portion is arranged to move pivotally relative to the lower portion during an initial phase of movement from the open position toward the closed position, and arranged to move linearly relative to the lower portion during a later phase of movement from the open position toward the closed position.

14. The machine of claim 12, wherein the upper portion includes forward and rear cam followers arranged to respectively engage with forward and rear cams of the frame.

15. The machine of claim 14, wherein the rear cam defines a linear path along the frame for the rear cam follower and the forward cam defines an S-shaped path along the frame for the forward cam follower.

16. The machine of claim 14, wherein the forward and rear cam followers are pins and the forward and rear cams are grooves.

17. The machine of claim 12, wherein in the actuator includes a handle pivotally mounted to the frame and having a handle gear arranged to drive movement of the upper portion with movement of the handle.

18. The machine of claim 17, wherein the actuator further includes a spur gear having a strut, the spur gear being pivotally mounted to the frame and engaged with the handle gear such that movement of the handle causes rotation of the spur gear, and
a link connected at a first end to the strut and connected at a second end to the upper portion such that rotation of the spur gear causes movement of the upper portion relative to the frame.

19. A beverage making machine, comprising:
a frame arranged to support components of the beverage making machine;
a cartridge holder supported by the frame and arranged to hold a cartridge containing a material used by the beverage making machine to form a beverage, the cartridge holder including,
a lower portion arranged to receive and hold the cartridge placed at a cartridge receiving area of the lower portion,
an upper portion movable relative to the lower portion between an open position in which the cartridge receiving area is exposed for placement of the cartridge and a closed position in which the upper and lower portions enclose the cartridge to access material in the cartridge to form the beverage, and
an actuator arranged to move the upper portion between the open and closed positions, the actuator including:
a handle separated from the upper portion and pivotally mounted to the frame;
a sector gear connected to the handle and pivotally mounted to the frame;
a spur gear pivotally mounted to the frame and engaged with the sector gear such that movement of the handle causes rotation of the spur gear; and
a strut having a first end connected to the spur gear and a second end associated with the upper portion such that rotation of the spur gear causes movement of the upper portion relative to the frame; and
a precursor liquid supply to provide precursor liquid used to form the beverage using the material in the cartridge.

20. The machine of claim 19, wherein the actuator includes a link pivotally connected at a first end to the strut and pivotally connected at a second end to the upper portion.

21. A beverage making machine, comprising:
a cartridge holder arranged to hold a cartridge containing a beverage medium used by the beverage making machine to form a beverage;
a precursor liquid supply to provide precursor liquid used to form the beverage using the beverage medium in the cartridge, the precursor liquid supply including a dispense line; and
a mixing chamber defining an enclosed volume and having:
a first opening configured to receive the beverage medium from the cartridge of the cartridge holder and extending into a beverage medium chamber within the enclosed volume;
a second opening configured to receive the precursor liquid from the dispense line; and
a third opening configured to dispense a mixture of the beverage medium and the precursor liquid, wherein the second and third openings extend into the enclosed volume for fluidic communication with one another and the beverage medium chamber within the enclosed volume, thereby mixing the beverage medium and the precursor liquid for dispensing at a dispensing station of the beverage making machine, and wherein the mixing chamber is mounted to a drawer that is removable from the beverage making machine by sliding, removal of the drawer from the beverage making machine disengaging the first opening from the cartridge holder and the second opening from the dispense line, and replacement of the drawer fluidly coupling second opening with the dispense line and arranging the first opening adjacent the cartridge holder.

22. The machine of claim 21, wherein the mixing chamber is removable from the drawer.

23. The machine of claim 21, wherein the beverage medium chamber includes a chamber inlet fluidly coupled to the second opening and a chamber outlet downstream of the chamber inlet and fluidly coupled to the third opening,
wherein the mixing chamber is arranged such that, with the precursor liquid flowing from the second opening to the third opening, pressurized beverage medium in the beverage medium chamber flows through the chamber outlet to the third opening and flow of the precursor liquid into the beverage medium chamber via the chamber inlet is prevented, and with the precursor liquid flowing from the second opening to the third opening, the precursor liquid flows into the beverage medium chamber via the chamber inlet in the absence of the pressurized beverage medium in the beverage medium chamber.

24. The machine of claim 23, wherein the mixing chamber is at least partially defined by a 90 degree elbow extending between the second opening and the third opening, and wherein the chamber inlet is positioned at an upstream end of the 90 degree elbow, and the chamber outlet is positioned at a downstream end of the 90 degree elbow.

25. The machine of claim 24, wherein the chamber inlet and chamber outlet are positioned at a radially outer wall of the 90 degree elbow.

26. The machine of claim 24, wherein the chamber outlet includes a plurality of channels that lead downwardly from the beverage medium chamber.

27. The machine of claim 24, wherein the chamber inlet is oriented in a horizontal direction and the chamber outlet is arranged in a vertical direction.

28. The machine of claim 23, wherein the mixing chamber includes an annular rim arranged to engage with a cartridge outlet to cause the cartridge outlet to open.

29. The machine of claim 23, wherein the beverage medium chamber is arranged to receive the beverage medium that flows in a downward direction from the cartridge, the second opening is arranged to receive the precursor liquid in a horizontal direction into the beverage medium chamber, and the chamber outlet is arranged to conduct flow of the beverage medium downwardly to the third opening.

30. A beverage making machine, comprising:
a cartridge holder arranged to hold a cartridge containing a material used by the beverage making machine to form a beverage, the cartridge holder including,
a lower portion arranged to receive and hold a cartridge placed at a cartridge receiving area of the lower portion,
an upper portion movable relative to the lower portion between an open position in which the cartridge receiving area is exposed for placement of a cartridge and a closed position in which the upper and lower portions enclose the cartridge to access material in the cartridge to form the beverage, and
an actuator arranged to move the upper portion between the open and closed positions;
a precursor liquid supply to provide precursor liquid used to form the beverage using the material in the cartridge;
a cartridge sensor arranged to detect a presence of a cartridge at the cartridge receiving area; and
control circuitry including a holder sensor programmed to determine an intermediate position of the upper portion between the open position and the closed position, the control circuitry arranged to activate the cartridge sensor when the holder sensor detects the upper portion at the intermediate position.

31. The machine of claim 30, wherein the holder sensor includes a first switch to detect the upper portion at the open position and a second switch to detect the upper portion at the closed position.

32. The machine of claim 30, wherein the cartridge sensor includes an infrared light emitter and an infrared light detector.

33. The machine of claim 30, wherein the control circuitry is arranged to deactivate the cartridge sensor if the upper portion is detected at the open position after the cartridge sensor is activated.

34. The machine of claim 30, further comprising a second cartridge sensor arranged to detect whether a cartridge in the cartridge holder is authorized for use by the machine.

35. The machine of claim 30, wherein the control circuitry is further programmed to use information from the cartridge sensor only if the holder sensor detects the upper portion at the closed position without again detecting the upper portion at the open position after the cartridge sensor is activated.

* * * * *